US012082179B2

(12) United States Patent
Dai et al.

(10) Patent No.: US 12,082,179 B2
(45) Date of Patent: Sep. 3, 2024

(54) RECONFIGURABLE INTELLIGENT SURFACE (RIS) INFORMATION UPDATE

(71) Applicant: QUALCOMM INCORPORATED, San Diego, CA (US)

(72) Inventors: Yucheng Dai, San Diego, CA (US); Wooseok Nam, San Diego, CA (US); Tao Luo, San Diego, CA (US); Junyi Li, Franklin Park, NJ (US); Peter Gaal, San Diego, CA (US); Sony Akkarakaran, Poway, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 17/301,416

(22) Filed: Apr. 1, 2021

(65) Prior Publication Data
US 2022/0322321 A1    Oct. 6, 2022

(51) Int. Cl.
*H04W 72/044* (2023.01)
*H01Q 1/24* (2006.01)
*H01Q 19/18* (2006.01)
*H04L 41/0813* (2022.01)
*H04W 48/16* (2009.01)
*H04W 52/02* (2009.01)
*H04W 72/51* (2023.01)

(52) U.S. Cl.
CPC .......... *H04W 72/046* (2013.01); *H01Q 1/246* (2013.01); *H01Q 19/18* (2013.01); *H04L 41/0813* (2013.01); *H04W 48/16* (2013.01); *H04W 52/0206* (2013.01); *H04W 72/51* (2023.01)

(58) Field of Classification Search
None
See application file for complete search history.

(56) References Cited

U.S. PATENT DOCUMENTS

| 2014/0037291 A1* | 2/2014 | Yan ..................... H04B 10/6163 398/65 |
| 2016/0226596 A1* | 8/2016 | Stojanovic ....... H04B 10/07951 |
| 2018/0191065 A1* | 7/2018 | Ma .......................... H01Q 3/38 |

(Continued)

FOREIGN PATENT DOCUMENTS

| CN | 112491773 A * | 3/2021 | .......... H04B 7/0857 |
| WO | WO-2021239259 A1 * | 12/2021 | |

(Continued)

OTHER PUBLICATIONS

ZTE, Sanechips, Support of Reconfigurable Intelligent Surface for 5G Advanced, 3GPP TSG RAN Meeting #91e Electronic Meeting, Mar. 16-21, 2021, RP-210618, Total 7 Pages. (Year: 2021).*

*Primary Examiner* — Liem H. Nguyen
(74) *Attorney, Agent, or Firm* — Haynes and Boone, LLP/ Qualcomm

(57) ABSTRACT

Wireless communications systems and methods related to information associated with a reconfigurable intelligent surface (RIS) in a wireless communication network are provided. For example, a method of wireless communication performed by a wireless communications device may include transmitting, to a reconfigurable intelligent surface (RIS), a request for information associated with the RIS and receiving, from the RIS, the information. Other features are also claimed and described.

30 Claims, 12 Drawing Sheets

(56) References Cited

U.S. PATENT DOCUMENTS

| | | |
|---|---|---|
| 2021/0126359 A1* | 4/2021 | Kim .................... H04B 1/1676 |
| 2021/0302561 A1* | 9/2021 | Bayesteh ................ G01S 13/42 |
| 2022/0014935 A1* | 1/2022 | Haija ................... H04L 5/0048 |
| 2022/0021125 A1* | 1/2022 | Baligh ................... H01Q 21/06 |
| 2022/0052764 A1* | 2/2022 | Medra ................... H04L 27/38 |
| 2022/0059943 A1* | 2/2022 | Saab .................... H04B 7/0617 |
| 2023/0208479 A1* | 6/2023 | Wang ................... H04B 7/0617 |
| | | 375/262 |
| 2023/0261708 A1* | 8/2023 | Jiang ................... H04L 5/0091 |
| | | 370/252 |
| 2023/0361853 A1* | 11/2023 | Zander ................ H04B 7/0617 |
| 2023/0421209 A1* | 12/2023 | Jiang ................. H04B 7/04013 |
| 2024/0039592 A1* | 2/2024 | Dai ................... H04B 7/04013 |

FOREIGN PATENT DOCUMENTS

| | | | |
|---|---|---|---|
| WO | WO-2022133957 A1 | * | 6/2022 |
| WO | WO-2022150118 A1 | * | 7/2022 |

\* cited by examiner

RECONFIGURABLE INTELLIGENT SURFACE (RIS) INFORMATION UPDATE

TECHNICAL FIELD

This application relates to wireless communication systems, and more particularly to updating information associated with a reconfigurable intelligent surface (RIS) in a wireless communication network.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs) and a number of RISs, each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth, a higher throughput, and/or a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as mmWave bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In some wireless communications networks a RIS may be deployed to control the channel or signal propagation paths between the BS and the UE. The RIS may control the channel by reflecting, forming, and/or modulating the radio signals from the BS to the UE and/or from the UE to the BS. As use cases and diverse deployment scenarios continue to expand in wireless communication, RIS controlling and/or configuration technique improvements may also yield benefits.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a wireless communication device may include transmitting, to a reconfigurable intelligent surface (RIS), a request for information associated with the RIS and receiving the information from the RIS.

In an additional aspect of the disclosure, a method of wireless communication performed by a reconfigurable intelligent surface (RIS) may include operating the RIS in a first mode, wherein the first mode has a different transmit capability than a second mode and providing information associated with the RIS.

In an additional aspect of the disclosure, a wireless communication device may include a memory, a transceiver, and a processor coupled to the memory and the transceiver, wherein the processor is configured to transmit, to a reconfigurable intelligent surface (RIS) via the transceiver, a request for information associated with the RIS and receive, from the RIS via the transceiver, the information.

In an additional aspect of the disclosure, a reconfigurable intelligent surface (RIS) apparatus may include a reflector array configured to control a wireless propagation channel and a controller in communication with the reflector array, the controller configured to cause the RIS to provide information associated with the RIS.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
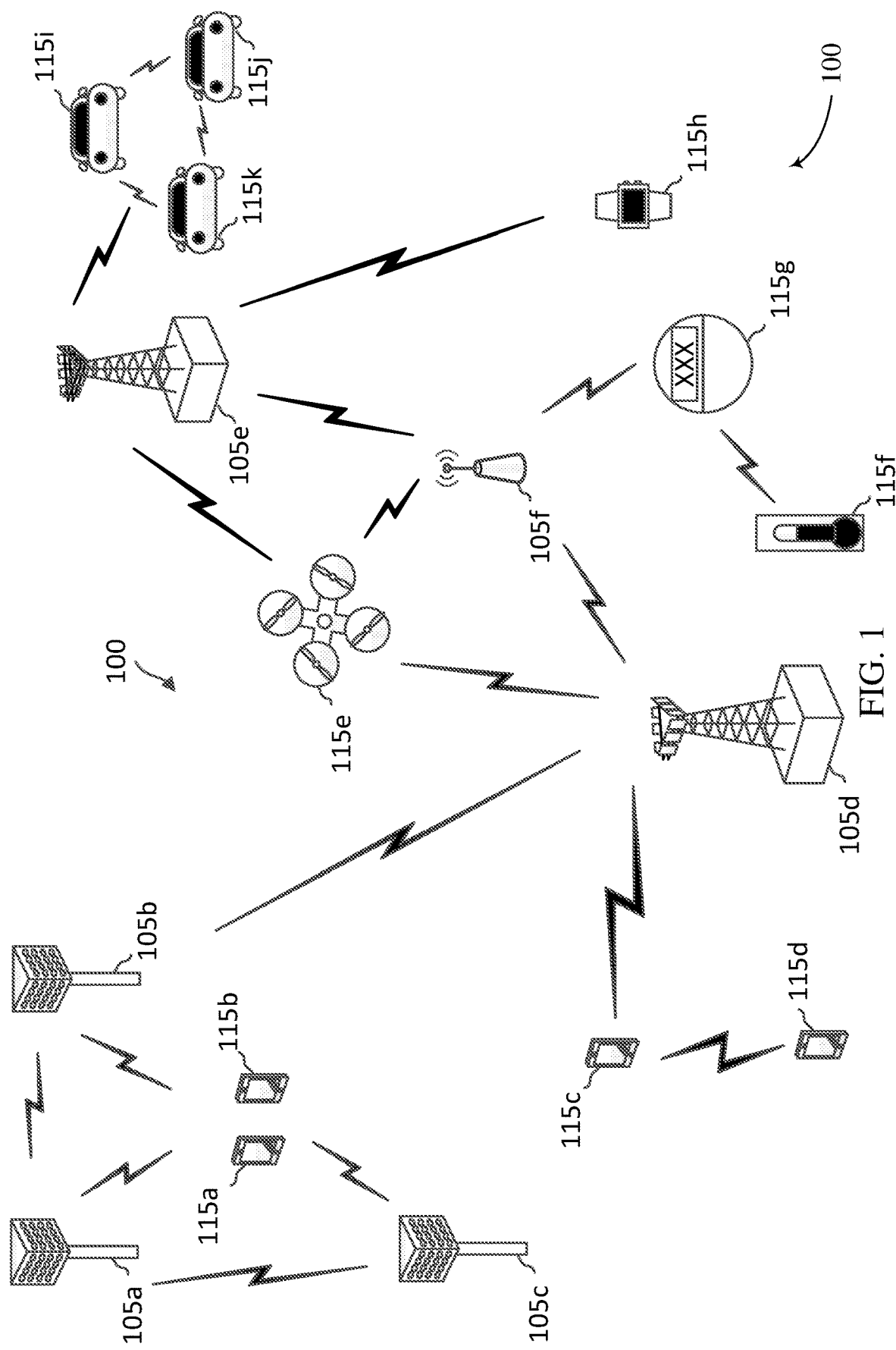
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a Ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into two different frequency ranges, a frequency range one (FR1) and a frequency range two (FR2). FR1 bands include frequency bands at 7 GHz or lower (e.g., between about 410 MHz to about 7125 MHz). FR2 bands include frequency bands in mmWave ranges between about 24.25 GHz and about 52.6 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

As discussed above, a base station (BS) may configure one or more RISs to control signal propagation paths between the BS and one or more UEs for improved communications. In some instances, it may be desirable for the RIS to provide the BS (or other control node in the wireless network) with information associated with the RIS. The information may include at least one status and/or a mode of the RIS (e.g., silent (not transmitting), online, offline, wake mode, sleep mode, etc.) and/or parameters associated with functionality of the RIS (e.g., location, battery charge status, capabilities, identification, authentication, etc.) In some instances, the RIS may have limited capabilities for transmitting information. For example, the RIS may be in a sleep mode in which the transmitter is partially or completely powered down. As another example, the RIS may be configured with a transmitter having a limited transmission range and/or the RIS may be positioned and/or located such that the BS is out of communication range. As a result, there is a need for improved systems, methods, and devices for updating information associated with RISs in a mode/status associated with limited transmission capabilities. In some aspects, the RIS can operate in a first mode associated with limited transmission capabilities (e.g. a sleep mode, an offline mode, and/or other silent or limited transmission mode) at some times and in a second mode associated with different transmission capabilities (e.g., a wake mode, an online mode, and/or other mode with greater transmission capabilities) at other times.

The present disclosure describes mechanisms for facilitating the updating of information associated with a RIS (e.g., a silent RIS) to provide configurable channels or configurable signal propagation paths in a wireless communication network. In some aspects, a control node (e.g., a BS, a gNB, etc.) of the network may control or configure at least one RIS in the network to provide suitable channels for communicating with one or more UEs. To facilitate the operations of the RISs within the wireless network, it may be beneficial for the control node to obtain information associated with the RIS. In some aspects, a first wireless communication device in the wireless communication network may transmit a signal to a RIS inquiring information associated with the RIS and a second wireless communication device in the wireless communication device may receive the information associated with the RIS from the RIS. In some aspects, the first wireless communication device may correspond to a BS in the network, and the second wireless communication device may correspond to a UE in the network. In another aspect, the first wireless communication device may correspond to a UE in the network, and the second wireless communication device may correspond to a BS in the network. In some aspects, the first wireless communication device may transmit the request to the second wireless communication device, and the second wireless communication device may relay the request to the RIS. Further, the second wireless communication device may receive the information from the RIS and forwards the information to the first wireless communication device. In a further aspect, the first wireless communication device and the second wireless communication device may correspond to the same device, which may be a BS or a UE. In some aspects, the RIS may provide a wireless communication device in the network with information (e.g., updates) associated with the RIS based on certain triggering condition(s). That is, the RIS may provide the information without receiving a request from a wireless communication device. Some examples of the triggering conditions may include, but not limited to, waking up from a low-power mode (e.g., a sleep mode), expiration of a timer (e.g., an information update timer), detection of a new location of the RIS 518, etc.

In some instances, a RIS may be operating in a mode (e.g., a silent mode, a sleep mode, a power conservation mode, a receiver-only mode, etc.) which limits the transmit capabilities of the RIS and therefore limits the capabilities of the RIS to transmit (e.g., directly transmit) the information to the BS. In other instances, the RIS may not have a transmitter. The BS may detect that the RIS is in the mode having limited transmit capabilities and may employ methods of receiving the information associated with the RIS. For example, the BS may transmit a signal (e.g., a sensing signal, an impinging signal, an incident signal, a reference signal, etc.) to the RIS. The RIS may watermark the signal with the information associated with the RIS and reflect the watermarked signal back to the BS. The BS may receive the watermarked signal and extract (e.g., decode, demodulate) the information from the watermarked signal. In some instances, the BS may transmit the signal to the RIS, and the RIS may watermark the signal with the information and reflect the watermarked signal to a second, different BS and/or to a UE. The second BS and/or the UE may receive the watermarked signal and extract (e.g., decode, demodulate) the information from the watermarked signal. The information extracted from the watermarked signal may then be transmitted to the BS that transmitted the original signal.

In some instances, a UE may transmit a signal to the RIS, the RIS may watermark the signal with the information and reflect the watermarked signal to the UE. The UE may receive the watermarked signal and extract (e.g., decode, demodulate) the information from the watermarked signal. The information extracted from the watermarked signal may then be transmitted to a control node (e.g., a BS).

In some instances, a BS may transmit a request for the RIS information to a UE that is proximate to (e.g., nearby) the RIS. The UE may transmit the signal to the RIS, the RIS may watermark the signal with the information and reflect the watermarked signal to the UE. The UE may receive the watermarked signal and extract (e.g., decode) the information from the watermarked signal. The information extracted from the watermarked signal may then be transmitted to the BS that transmitted the request for information.

In some instances, the signal may include a reference signal, a cell specific reference signal, a pilot signal, a downlink reference signal, a phase-tracking reference signal (PRS), a demodulation reference signal (DMRS), a user equipment specific reference signal (e.g., a sounding reference signal (SRS)), or a RIS specific reference signal.

In some instances, a BS may transmit a first request for the RIS information to a UE that may be configured to directly communicate with the RIS. The UE may transmit a second request for RIS information to the RIS in response to receiving the first request. The second request may be transmitted to the RIS over a communication link (e.g., a sidelink) between the UE and the RIS. The RIS may respond to the second request for information by transmitting the information to the UE over the sidelink. The UE may transmit the information to the BS that requested the information using a control channel Aspects of the present disclosure can provide several benefits. For example, utilizing watermark to encode information onto a reflected signal from the RIS allows a RIS with limited transmit capabilities to provide a control node (a BS) in the network with information associated with the RIS. Additionally, configuring a UE to assist in obtaining RIS information allows the BS to obtain information from an RIS that may not reach the BS directly. Further, having updated information (e.g., location, battery charge status, operational mode status) about the RIS, the BS may better control and configure channels or signal propagation paths among wireless communication devices in the network to provide improved communication performance.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as vehicle-to-vehicle (V2V), vehicle-to-everything (V2X), cellular-V2X (C-V2X) communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using hybrid automatic repeat request (HARQ) techniques to improve communication reliability, for example, to provide an ultra-reliable low-latency communication (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ acknowledgement (ACK) to the BS 105. Conversely, if the UE 115 fails to receive the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may include at least one RIS deployed to control the channel between the BSs 105 and the UEs 115. The RIS may control the channel by reflecting the radio signals from the BSs 105 to the UEs 115 and/or by reflecting the radio signals from the UEs 115 to the BSs 105. As described below with reference to FIGS. 2 and 3, the RIS may be deployed to provide additional wireless network coverage and increased bandwidth for UEs 115. In some instances, the RIS may provide the BSs 105 (or other control node in the network 100) with information associated with the RIS. The information may include a status of the RIS (e.g., online, offline, wake mode, sleep mode, etc.) and/or parameters associated with functionality of the RIS (e.g., location, battery charge status, capabilities, identification, authentication, etc.) In some instances, the RIS may have limited capabilities for transmitting information (e.g., the RIS is silent). For example, the RIS may be in a sleep mode in which the transmitter is powered down. As another example, the RIS may be configured with a transmitter having a limited transmission range and/or the RIS may be positioned and/or located such that the BSs 105 are out of direct communication range as will be described in detail below with reference to FIG. 3.

The information associated with the RIS may be required by the BSs 105 in the network 100 to facilitate operation of the RIS within the network 100. The BSs 105 may detect that the RIS is in a mode having limited transmit capabilities and may employ methods of receiving the information associated with the RIS. For example, the BSs 105 may transmit a signal (e.g., a sensing signal) to the RIS. The RIS may watermark the signal with the information associated with the RIS and reflect the watermarked signal back to the BSs 105. The BSs 105 may receive the watermarked signal and extract (e.g., decode, demodulate) the information from the watermarked signal. In some instances, the BSs 105 may transmit the signal to the RIS, the RIS may watermark the signal with the information and reflect the watermarked signal to a second, different BS 105 and/or a UE 115. The second BS 105 and/or the UE 115 may receive the watermarked signal and extract the information from the watermarked signal. The information extracted from the watermarked signal may then be transmitted to the BS 105 that transmitted the original signal.

In some instances, the BSs 105 may transmit a request for the information to a UE 115 that is proximate to (e.g., nearby) the RIS. For example, the BS 105d may transmit a request for the information to the UE 115c that is nearby the RIS. The UE 115c may transmit the signal to the RIS, the RIS may watermark the signal with the information and reflect the watermarked signal to the UE 115c. The UE 115c may receive the watermarked signal and extract the information from the watermarked signal. The information extracted from the watermarked signal may then be transmitted to the BS 105d that transmitted the request for information.

Figure 2:
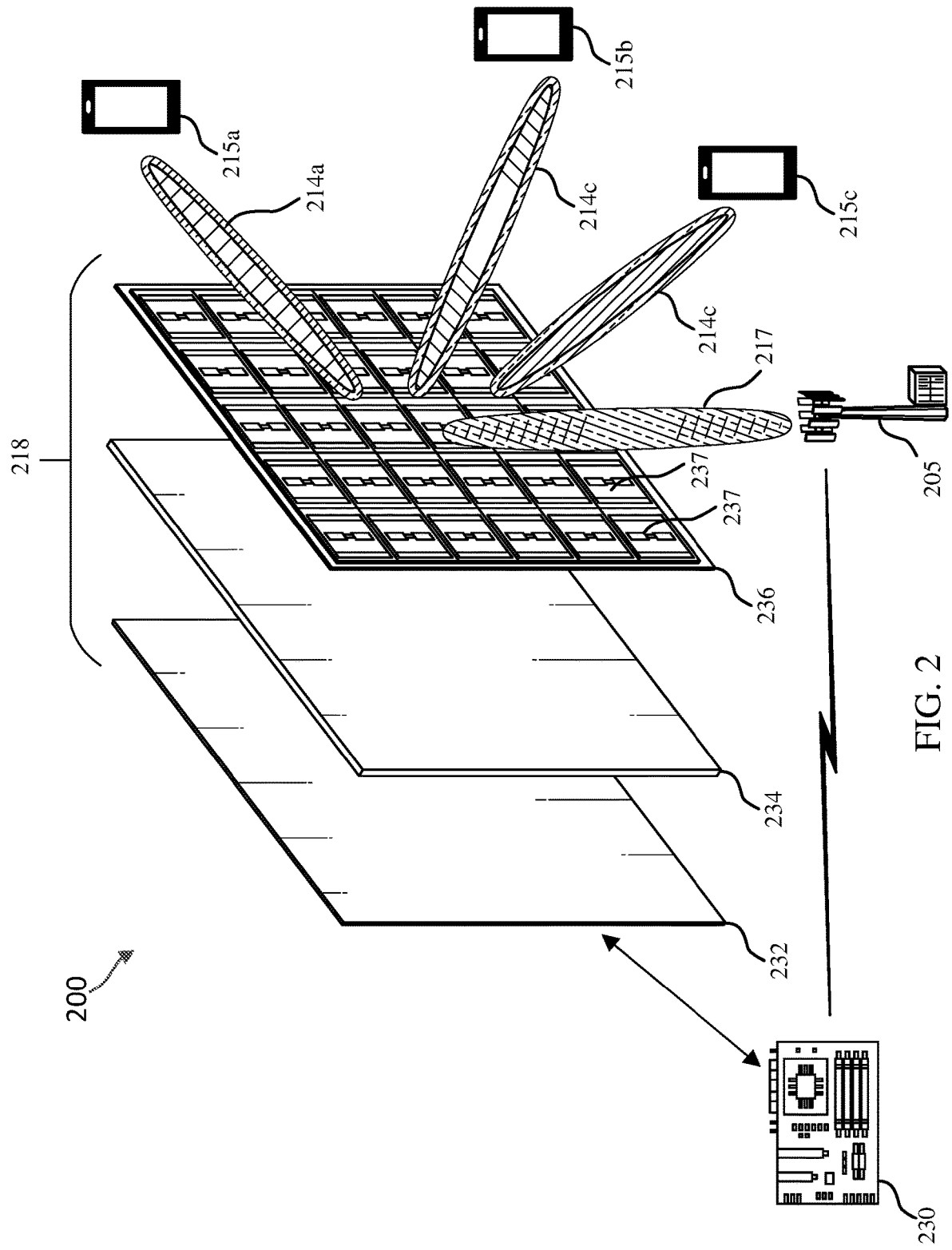
FIG. 2 illustrates a wireless communication network that utilizes a reconfigurable intelligent surface (RIS) to provide configurable wireless communication channels according to some aspects of the present disclosure.

FIG. 2 illustrates a wireless network 200 that utilizes a RIS 218 to provide configurable wireless communication channels according to some aspects of the present disclosure. The network 200 may be similar to the network 100. FIG. 2 may illustrate exemplary operations of the RIS 218. For simplicity of illustration and discussion, FIG. 2 illustrates one BS 205 in communication with three UEs 215 (shown as 215a, 215b, and 215c) and controlling channels between the BS 205 and the UEs 215 utilizing the RIS 218. However, the BS 205 may control channels between the BS 205 and any suitable number of UEs 215 (e.g., 1, 2, 4, 5, 6, or more). The BS 205 may be similar to the BSs 105, and the UEs 215 may be similar to the UEs 115.

In the network 200, the RIS 218 may be configured to control the reflection, refraction, and/or scattering of electromagnetic waves (e.g., radio signals) to shape a wireless communication channel. The RIS 218 may include a two-dimensional array 236 of reflecting surface elements 237. In some instances, the reflecting surface elements 237 may be uniformly distributed on the array 236. In other instances, the reflecting surface elements 237 may not be uniformly distributed on the array 236. In general, the reflecting surface elements 237 may be arranged in any suitable arrangement on the array 236. The reflecting surface elements 237 may be composed of any suitable materials that may modify (e.g., reflect, refract, and/or scatter) an incident radio signal waveform. In some aspects, the RIS 218 may comprise integrated electronic circuits configured to control the shaping of the wireless communication channel. That is, the RIS 218 may modify an incident radio signal waveform in a controlled manner to enhance or improve channel diversities. Increasing channel diversities may provide robustness to channel blocking and/or fading, which may be particularly useful for mmWave communications. For example, the elements 237 of array 236 may be controlled by programmable diodes (e.g., PIN diodes, varactor diodes). For each element 237, an electromagnetic response (e.g., amplitude changes, RF absorption levels, polarization changes, and/or phase changes) may be applied to an incident signal 217 (e.g., an impinging RF signal, a reference signal, etc.). In some aspects, the RIS 218 may be in communication with a controller 230 that is configured to control the array 236. In some instances, the controller 230 may be a field programmable gate array (FPGA) or a processor. The controller 230 may receive commands from a control node that includes the desired electromagnetic response(s) to be implemented by the RIS 218. The controller 230 may configure the RIS 218 such that a combined state of the elements 237 on the RIS 218 may provide a desired target channel or signal propagation paths between two devices (e.g., the BS 205 and the UE 215a, the 215b, and/or UE 215c). In some aspects, the elements 237 on the RIS 218 may be individually configured or activated. In some aspects, the controller 230 may activate a subset of the elements 237. That is, the controller 230 may not activate all the elements 237 simultaneously. For, instance, the controller 230 may configure some of the elements 237 to be in an idle mode or a sleep mode, for example, to provide power saving. An activated element 237 may refer to an element 237 that is actively operating on an incident radio signal waveform, for example, to modify a phase, an amplitude, and/or a polarization of the signal waveform. In other aspects, the controller 230 may activate all the elements 237. In general, the controller 230 may activate any suitable number of elements (e.g., 10, 20, 30, 50, 100, 200 or more) to provide a certain channel or signal propagation path. In some instances, the control node may include BS 205 and the impinging signal may be transmitted by BS 205.

In some instances, the elements 237 of array 236 may include a planar structure and PIN diodes embedded on the surface of each element 237. The PIN diodes may be configured to be switched on and off by controller 230 by routing control signals through routing layer 232 (e.g. a printed circuit board with conductive traces and vias). The controller 230 may bias the PIN diodes and control two different states for the element 237. In the first state when the PIN diodes are off, the element 237 may represent an RF transparent surface which allows the incoming energy of incident signal 217 to pass through the element 237. When the PIN diodes are switched to the second state, the majority of the incoming energy of incident signal 217 is reflected away from the surface of the array 236.

In some instances, the incident signal 217 is reflected by adjusting phase shifts that constructively interfere and steer the reflected signals 214a, 214b, and 214c towards UE 215a, 215b, and 215c respectively, for example, in order to effectively control multi-path effects. The RIS 218 may steer the reflected signals 214a, 214b, and 214c through 3-dimensional passive beamforming thereby improving spectrum and energy efficiency. The RIS 218 may operate different from traditional amplify-and-forward (AF), backscatter communication, and massive multiple-input multiple-output (MIMO) devices. The RIS 218 may be configured to forward (e.g., reflect) a more efficient phase-shifted version of the incident signal 217 and shape channel propagation to adapt against channel variations due to unpredictable wireless environments. The RIS 218 architecture may be substantially passive and its operating mechanism may reflect the incident signal 217 rather than regenerate the incident signal 217. Thus, the RIS 218 may not perform radio frequency coding/decoding/amplification and therefore consume less power than traditional AF solutions. The RIS 218 may support full-duplex and full-band communications.

The RIS 218 may be constructed as a multilayer printed circuit board (PCB), where the reflecting elements 237 are equally spaced in a two-dimensional plane as shown with reference to array 236. The RIS 218 may include a conductive (e.g., copper) backplane layer 234 that supports the reflective properties of array 236. The RIS 218 may further include a routing layer 232 configured to route control signals from the controller 230 to the individual elements 237. It should be understood that the RIS 218 structure illustrated in FIG. 2 is for exemplary purposes and aspects are not limited thereto. In general, the RIS 218 may have any suitable structure that can be configured to modify an incident radio waveform signal in a controller manner to provide channel diversity.

Figure 3:
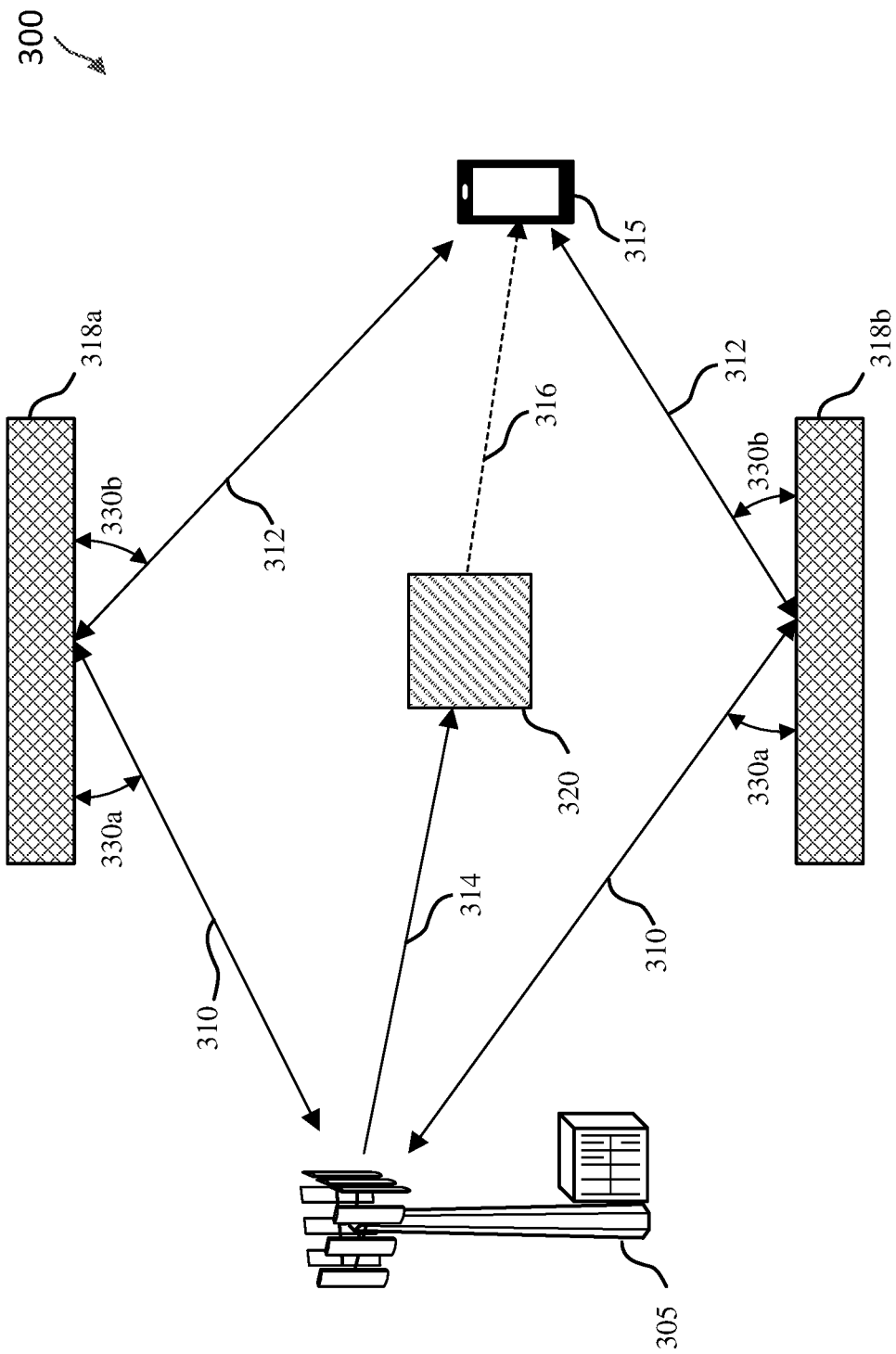
FIG. 3 illustrates a wireless communication network that utilizes RISs to provide configurable wireless communication channels according to some aspects of the present disclosure.

FIG. 3 illustrates a wireless network 300 including RIS 318a and RIS 318b to provide configurable wireless communication channels according to some aspects of the present disclosure. The network 300 may be similar to the network 100. The RISs 318a and 318b may be substantially similar to the RIS 218 of FIG. 2. FIG. 3 illustrates exemplary operations of the RISs 318a and 318b in facilitating communications between a BS 305 and a UE 315. The BS 305 may be similar to the BSs 105 and/or 205, and the UE 315 may be similar to the UEs 115 and/or 215. For simplicity of illustration and discussion, FIG. 3 illustrates the BS 305 utilizing two RISs 318a and 318b to modify a channel communication path between the BS 205 and the UE 315. However, the BS 305 may utilize any suitable number of RISs (e.g., 1, 3, 4, 5, or more) to modify the channel communication path. In some configurations of the wireless network 300, a UE 315 may be positioned such that an object 320 may be along a line-of-sight path 314 from the BS 305 to the UE 315. In some instances, the object 320 may cause the radio signals transmitted by the BS 305 along the path 314 to be attenuated such that the signal traveling on the path 316 to the UE 315 provides a reduced (e.g., significantly reduced) strength level to the UE 315 resulting in diminished performance (e.g., reduced bandwidth) to the UE 315. In other instances, the object 320 may obstruct the signals between the UE 315 and the BS 305 completely, where the UE 315 may not receive any signal from the BS 305. In any case, the BS 305 may not be able to achieve a good communication performance with the UE 315. In some instances, the BS 305 may overcome the limitations in the signal strength received by the UE 315 by utilizing the RIS 318a and/or the RIS 318b to modify the signal propagation path between the BS 305 and the UE 315. In this regard, the BS 305 may configure the RISs 318a and/or 318b such that signals transmitted by the BS 305 along paths 310 are reflected (e.g., beamforming) along paths 312 to UE 315. Paths 310 and 312 may be configured as free-space paths that effectively provide a virtual line-of-sight path between the BS 305 and the UE 315 thereby improving the wireless communication performance between the BS 305 and the UE 315.

The RIS 318a and RIS 318b may include an array of reflecting elements (as discussed above with reference to FIG. 2) that reconfigure the incident radio signals when reflecting the signals to the UE 315 or to the BS 305. The RIS 318a and RIS 318b may reconfigure the wireless propagation environment by compensating for a lack of a line-of-sight path between the BS 305 and the UE 315. The RIS 318a and RIS 318b may reconfigure the wireless propagation environment particularly for mm wave signals. In contrast to conventional wireless relaying systems, (e.g., amplify-and-forward (AF) and decode-and-forward (DF) systems), the RIS 318a and RIS 318b may be configured to redirect the incoming radio signal on the path 310 by controlling the phase shift of reflecting elements of the RIS 318a and/or RIS 318b of instead of employing a power amplifier. Thus, deploying the RIS 318a and RIS 318b may be more energy-efficient than conventional AF and DF systems. The RIS 318a and RIS 318b may be deployed to strengthen the signal power received by the UE 315 and/or the BS 305 and mitigate the interference from neighboring BSs by passive beamforming of the signals on paths 310 and 312.

In some instances, the RIS 318a and RIS 318b may include an array (e.g., a rectangular array) of controllable (e.g., individually controllable) surfaces as described in detail above with reference to FIG. 2. The controllable surfaces may include a material (e.g., a metamaterial) and/or diodes configured to reflect and/or refract the incident radio signal. The array of controllable surfaces may be configured such that angles of reflection 330a and 330b are individually and independently controllable allowing beam steering of the radio waves towards the UE 315 and/or the BS 305 in order to improve received signal strength and/or bandwidth.

As discussed above, it may be desirable for a control node (e.g., a BS 105, 205, and/or 305) of a network (e.g., the network 100, 200, and/or 330) to have information (e.g., most up-to-date information) associated with RISs (e.g., the RISs 218 and/or 318) in the network. In this way, the control node may configure the RIS to provide suitable wireless communication channels among devices (e.g., BSs 105, 205, and/or 305, and/or UEs 115, 215, and/or 315) in the network for optimal communication performance. FIGS. 4-7 illustrate various configurations for obtaining RIS information from a RIS.

Figure 4:
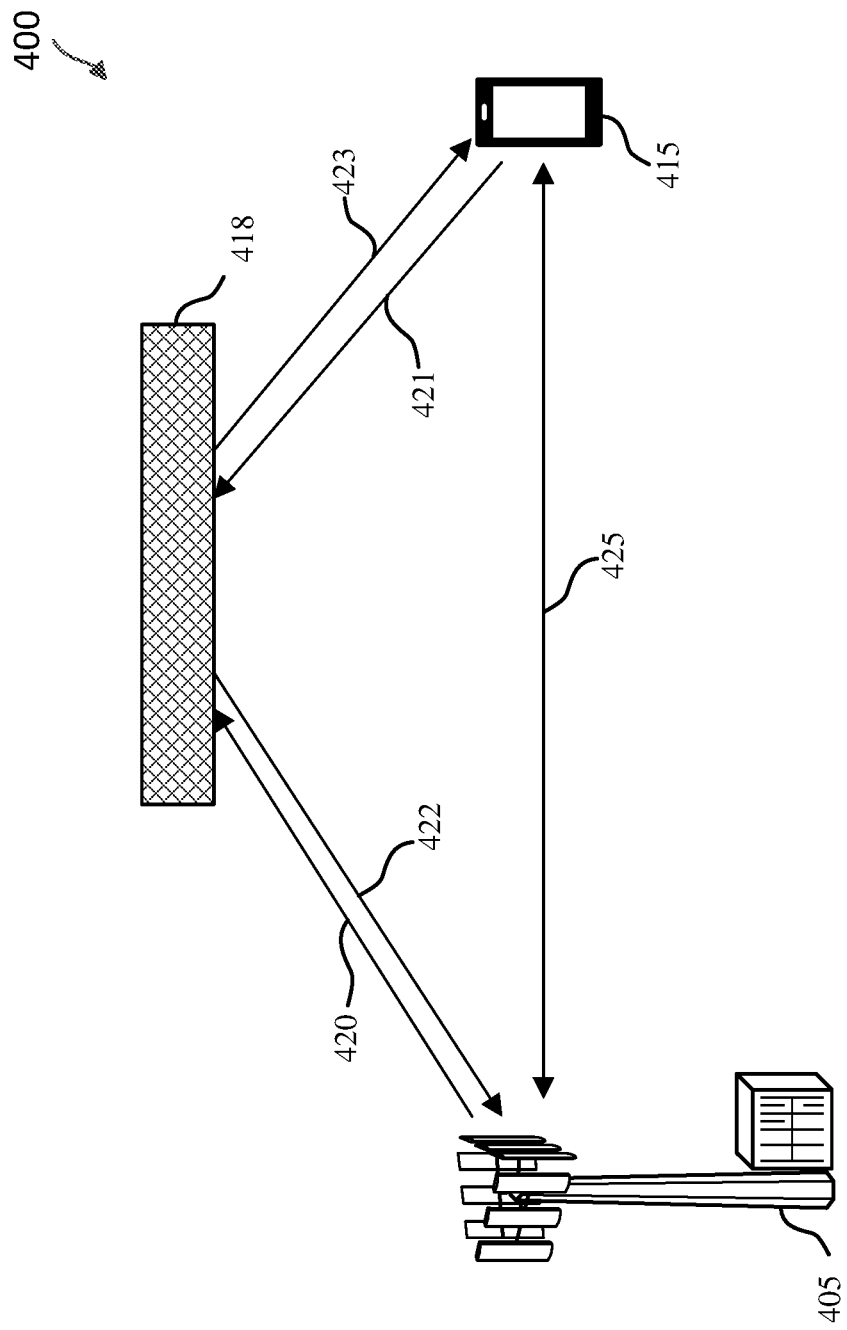
FIG. 4 illustrates a wireless communication network including a RIS configured to reflect a watermarked signal according to some aspects of the present disclosure.

FIG. 4 illustrates a wireless network 400 including a RIS 418 configured to reflect a watermarked signal according to some aspects of the present disclosure. The network 400 may be similar to the networks 100, 200, and/or 300. The RIS 418 may be substantially similar to the RIS 218, and/or 318. FIG. 4 illustrates exemplary operations for a control node (e.g., a BS 405) to obtain information associated with the RIS 418 from the RIS 418. The BS 405 may be similar to the BSs 105, 205, and/or 305, and the UE 415 may be similar to the UEs 115, 215, and/or 315. For simplicity of illustration and discussion, FIG. 4 illustrates the BS 405 obtaining information for one RIS 418. However, the BS 405 may obtain RIS information for any suitable number of RISs (e.g., 1, 3, 4, 5 or more). In some instances, the RIS 418 may provide information to the control node to assist the control node in configuring the RIS 418 to provide a suitable channel for communication with a UE 415. The UE 415 may be similar to the UEs 115, 215, and/or 415. The BS 405 may obtain information associated with the RIS 418 to control the RIS 418. The information may include, without limitation, a location of the RIS 418, a battery charge status of the RIS 418, a mode status of the RIS 418, a sleep mode period of the RIS 418, or a wake mode period of the RIS 418. The BS 405 may obtain the information either directly from the RIS 418 or indirectly via the UE 415 as will be discussed below.

In some instances, the RIS 418 may be configured with limited transmit capabilities or no transmit capabilities. For example, the RIS 418 may be configured as a power limited device (e.g., a battery powered device) and limiting the transmit capabilities of the RIS 418 may limit the power consumption of the RIS 418. In some instances, the RIS 418 may be operating in a mode (e.g., a silent mode, a sleep mode, a low power mode) that limits the transmit capabilities of the RIS 418. In the case where the RIS 418 is operating in a mode with limited or no transmit capabilities, the BS 405 may transmit a signal (e.g., a sensing signal 420) to the RIS 418, and the RIS 418 may be configured to provide the information to the BS 405 by reflecting at least a portion of the sensing signal 420 to the BS 405 and/or the UE 415 and embedding the RIS information in the reflected signal. In some aspects, the RIS 418 may be configured to provide the information by watermarking the reflected signal. That is, the reflected signal is a watermarked signal that includes the information associated with the RIS 418. In some instances, the BS 405 may detect that the RIS 418 is operating in a mode that limits the transmit capabilities of the RIS 418 and transmit the sensing signal 420 based on the detected mode. For example, the BS 405 may detect that the RIS 418 is operating in a silent mode, a sleep mode, an idle mode, a low power mode, etc. based on the RIS 418 operating mode status stored in the BS 405 and/or another control node accessible to the BS 405 (e.g., a server).

In some instances, the BS 405 may request information associated with the RIS 418 by transmitting the sensing signal 420 to the RIS 418. That is, the sensing signal 420 may be indicative of an information request. In some instances, the sensing signal 420 may have a certain predetermined waveform. For instance, the sensing signal 420 may be a reference signal, a cell specific reference signal, a pilot signal, a downlink reference signal, a user equipment specific reference signal, a RIS specific reference signal, etc. The RIS 418 may respond to the request for information by modifying the sensing signal 420 to include the information requested by the BS 405. The RIS 418 may modify the sensing signal 420 to include the requested information by watermarking the sensing signal 420 or a portion of the sensing signal 420. The RIS may reflect a watermarked signal 422 back to the BS 405. The BS 405 may process (e.g., decode, demodulate) the watermarked signal 422 or a portion of the watermarked signal 422 to extract the information associated with the RIS 418.

In some instances, the RIS 418 is configured to receive the sensing signal 420 (e.g., an impinging signal, an incident signal) from the BS 405 and reflect at least a portion of the sensing signal 420 back to the BS 405. The RIS 418 may be configured to perform watermarking as the at least the portion of the sensing signal 420 (the watermarked signal 422) is reflected back to the BS 405. The watermarked signal 422 may be watermarked by a sequence of changes to one or more signal properties of the watermarked signal 422. The sequence of changes embedded in the watermarked signal 422 may include, without limitation, amplitude changes, polarization changes, phase changes, or a combination thereof. In some instances, the watermarking may include a common phase modulation to the received sensing signal 420 in which elements (e.g., individual reflectors) of the RIS 418 modulate the phase of the watermarked signal 422. The sequence of phase changes in the watermarked signal 422 reflected back to the BS 405 may encode the information associated with the RIS 418. The information associated with the RIS 418 may include, without limitation, a RIS identifier (e.g., a unique identifier) identifying the RIS 418 in the network 400, a location of the RIS 418, a mode status, a battery charge status, a sleep mode period, a wake mode period, a configuration, a firmware version, an error message, etc. The RIS 418 may include an array of reflective elements as discussed above with reference to FIG. 2. In some instances, the dimension of each element is smaller than a wavelength of the sensing signal 420 reflected by the RIS 418. The dimensions of each element may be about a fifth of the wavelength of the sensing signal 420. Each of the elements of the RIS 418 may have a configurable time delay that enables the sequence of phase shifts that watermark (e.g., encode) the information associated with the RIS 418. In some instances, the phase shifts may be selected from a finite set of phase shifts (e.g., ±45°, ±90°, ±135°, ±180°, etc.).

In some instances, the RIS 418 may configure one or more of the reflective elements such that a portion of the received sensing signal 420 reflected back to the BS 405 is watermarked. For example, the phase modulation may be imposed on a per-OFDM symbol level (e.g., at OFDM symbol boundaries). The phase change may be applied to every OFDM symbol of the watermarked signal 422 (e.g., a transmission burst) and/or to a portion (e.g., a pre-determined subset) of symbols of the watermarked signal 422. In some instances, the BS 405 may be configured to demodulate the watermarked signal 422. The BS 405 may demodulate the sequence of phase shifts in watermarked signal 422 to extract (e.g., decode) the information associated with the RIS 418.

Additionally or alternatively, the watermarking of the sensing signal 420 may include a polarization modulation to the received sensing signal 420 in which elements (e.g., individual reflectors) of the RIS 418 modulate the polarization of the watermarked signal 422. The sequence of polarization changes in the watermarked signal 422 reflected back to the BS 405 may be encoded with the information associated with the RIS 418. The RIS 418 may be configured to change (e.g., rotate) the polarization state of the received sensing signal 420 by changing the angle of polarization and/or the polarization orientation when the sensing signal 420 is reflected back to the BS 405. The polarization orientation may be modulated through any sequence and/or combination of linear, circular, or elliptical polarizations that enables the sequence of polarization changes to watermark (e.g., encode) the information associated with the RIS 418.

Additionally or alternatively, the watermarking of the sensing signal 420 may include an amplitude modulation to the received sensing signal 420 in which elements (e.g., individual reflectors) of the RIS 418 modulate the amplitude of the watermarked signal 422. The sequence of amplitude changes in the watermarked signal 422 reflected back to the BS 405 may encode the information associated with the RIS 418. The RIS 418 may be configured to modulate the amplitude of the sensing signal 420 by attenuating a sequence of portions of the sensing signal 420. The amplitude may be modulated through any sequence of attenuation (e.g., puncturing) that enables the sequence of amplitude changes to watermark (e.g., encode) the information associated with the RIS 418. The RIS 418 may modulate the amplitude using any method. For example, the RIS 418 may adjust certain reflecting elements to reflect watermarked signal 422 at an angle that effectively reduces the amplitude of the watermarked signal 422 received by the BS 405. The RIS 418 may adjust certain reflecting elements to reflect watermarked signal 422 away from the BS 405 such that portions (e.g., time portions) of the watermarked signal 422 are not received by the BS 405 (e.g., the signal strength is under a threshold detectable by the BS 405).

In some instances, the RIS 418 may configure certain reflecting elements to absorb (e.g., partially absorb) sensing signal 420 thereby reducing the amplitude of watermarked signal 422. The RIS 418 may be configured to use a combination of the amplitude modulation techniques described above. The RIS 418 may be further configured to use the amplitude modulation techniques described above over a sequence of time periods (e.g., 01-DM symbol time periods) to watermark (e.g., encode) the watermarked signal 422 with the RIS information.

In some instances, the watermarked signal 422 comprising the RIS 418 information is received by the BS 405. The watermarked signal 422 may be processed by the BS 405 to extract the RIS 418 information using any method. For example, the BS 405 may be configured to extract the RIS 418 information by demodulating the watermarked signal 422. The BS 405 may be configured to extract the RIS 418 information by demodulating the watermarked signal 422 based on the phase modulation, polarization modulation, amplitude modulation, or combined modulation techniques described above. In some instances, the BS 405 may have prior knowledge of the modulation techniques applied to the watermarked signal 422. In some instances, the BS 405 may determine the type of modulation or combination of modulation techniques used based on processing the watermarked signal 422.

In some instances, the UE 415 may obtain information associated with the RIS 418 using similar mechanisms as the BS 405 described above. For instance, the UE 415 may request information associated with the RIS 418 by transmitting a signal 421 (e.g., a sounding reference signal (SRS) or any suitable waveform signal) to the RIS 418. The RIS 418 may respond to the request for information by modifying the signal 421 to include the information requested by the BS 405. The RIS 418 may modify the signal 421 to include the requested information by watermarking the signal 421 or a portion of the signal 421 using the phase modulation, polarization modulation, and/or amplitude modulation methods described above.

The RIS 418 may reflect watermarked signal 423 back to the UE 415. The UE 415 may process (e.g., decode, demodulate) a watermarked signal 423 or a portion of the watermarked signal 423 to extract the information associated with the RIS 418. In some instances, the UE 415 may be configured to decode the RIS 418 information and transmit the information to the BS 405. The UE 415 may transmit the information to the BS 405 using any method and/or communication channel. For example, the UE 415 may transmit the information to the BS 405 as part of communication link 425, for example, via uplink control information (UCI) signaling, medium access control (MAC) control element (CE) signaling, radio resource control (RRC) signaling, or a combination thereof.

In some aspects, the RIS information updating mechanisms shown in FIG. 4 may support a mono-static RIS information update, a bi-static RIS information update, and/or a multi-static RIS information update. A mono-static RIS information update may refer to the BS 405 transmitting a sensing signal to the RIS 418 and receiving a watermarked signal (the sensing signal reflected from the RIS 418) encoded with the RIS 418 information from the RIS 418. A bi-static RIS information update may refer to the BS 405 transmitting a sensing signal to the RIS 418 and the UE 415 receiving a watermarked signal (the sensing signal reflected from the RIS 418) encoded with the RIS 418 information from the RIS 418. A multi-static RIS information update may refer to the BS 405 transmitting a sensing signal to the RIS 418 and multiple devices (e.g., the UE 415 and another BS or another UE) receiving a watermarked signal (the sensing signal reflected from the RIS 418) encoded with the RIS 418 information from the RIS 418.

Figure 5:
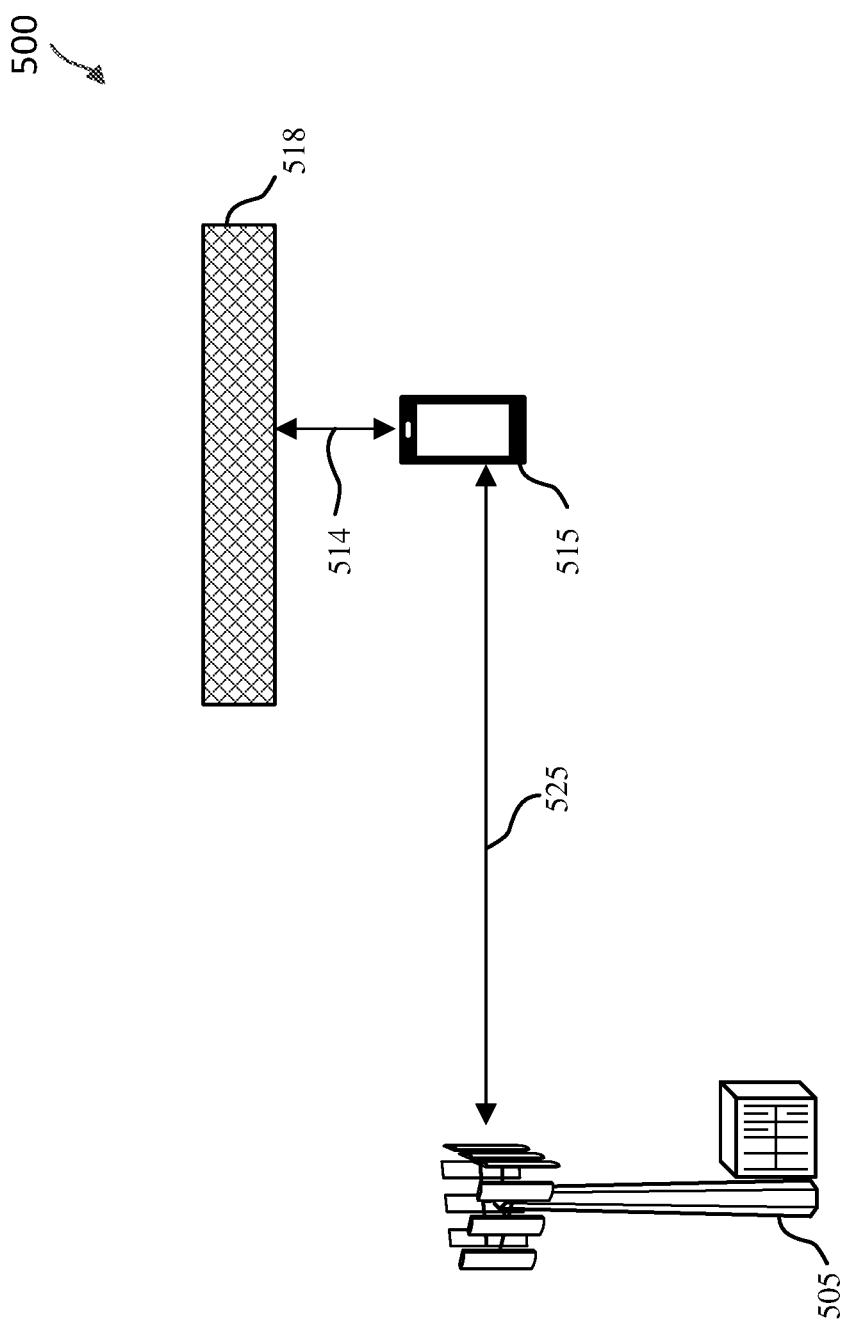
FIG. 5 illustrates a wireless communication network including a RIS configured to provide information to a base station (BS) via a user equipment (UE) according to some aspects of the present disclosure.

FIG. 5 illustrates a wireless network 500 including a RIS 518 configured to provide information to a BS 505 via a UE 515 according to some aspects of the present disclosure. The network 500 may be similar to the networks 100, 200, 300, and/or 400. The RIS 518 may be substantially similar to the RIS 218, 318, and/or 418. The BS 505 may be substantially similar to the BSs 105, 205, 305, and/or 405. The UE 515 may be substantially similar to the UEs 115, 215, 315, and/or 415. In some instances, the RIS 518 may be controlled by a control node in the wireless network 500. The RIS 518 may provide information to the control node to assist the control node in configuring the RIS 418 to provide a suitable channel for communication with the UE 515 or another UE. For example, the BS 505 may be configured to control the RIS 518. The BS 505 may obtain information associated with the RIS 518 to control the RIS 518 including, without limitation, a location of the RIS 518, a battery charge status, a mode status, a sleep mode period, or a wake mode period.

In some instances, the RIS 518 may be configured with limited transmit capabilities. The RIS 518 may be configured with transmit capabilities having a limited range. For example, the RIS 518 may be configured with a direct communication unit that limits transmit capabilities to devices within a limited range of the RIS 518. Referring to FIG. 5, the RIS 518 may be configured to transmit to the UE 515 when the UE 515 is within the range capable of sidelink communication with the RIS 518. Whereas, the BS 505 may be out of the range for communicating with the RIS 518. In the case where the RIS 518 is out of transmit range of the BS 505, the RIS 518 may transmit the RIS 518 information to the UE 515. The UE 515 may be configured as a relay device by transmitting the information to the BS 505. The UE 515 may transmit the RIS 518 information to the BS 505 over communication link 525 via uplink control information (UCI) signaling, medium access control (MAC) control element (CE) signaling, radio resource control (RRC) signaling, other signaling channels, or a combination thereof.

In some instances, the RIS 518 may receive a request for the information. For example, the UE 515 may send a request for the information to the RIS 518 over a sidelink 514 (e.g., PC5 interface) and the RIS 518 may transmit (e.g., transmit over a sidelink) the information to the UE 515 over the sidelink 514 in response to the request. In some instances, the BS 505 may request the information. In this case, the BS 505 may send a first request for the information to the UE 515 over a communication link 525 (e.g., Uu interface). The UE 515 may respond to the first request from the BS 505 by transmitting a second request for the information to the RIS 518 over the sidelink 514. The RIS 518 may respond to the second request for the information by transmitting the information to the UE 515 over the sidelink 514 in response to the second request. The UE 515 may then transmit the RIS 518 information to the BS 505 over communication link 525 (e.g., via a PUSCH or a PUCCH).

In some instances, the RIS 518 may initiate the transmission of information without receiving the request for information (e.g., RIS 518 self-initiated transmission). For example, the RIS 518 may initiate the transmission of information without receiving the request for information based on an event. The event may include waking up from a low-power mode (e.g., a sleep mode), expiration of a timer (e.g., an information update timer), detection of a new location of the RIS 518, etc. The RIS 518 may be configured as a mobile or nomadic device that may report its location and/or movements to a control node (e.g., BS 505). The RIS 518 may initiate the transmission of information to a wireless device in communication range of the RIS 518. For example, the RIS 518 may initiate transmission to the UE 515 via sidelink communication. As the UE 515 and other wireless devices in an area nearby the RIS 518 may be mobile devices, the RIS 518 may store information related to the position of the UE 515 and other wireless devices. The information related to the position of the UE 515 and other wireless devices may be determined by the RIS 518 (e.g., determined by radio frequency triangulation). In some instances, the BS 505 may periodically determine the location of the UE 515 or other wireless devices nearby RIS 518 that are capable of communicating with the RIS 518 and transmit the information (e.g., the UE 515 identification, the position of the UE 515, resources of the UE 515, a list of information parameters required from the RIS 518, etc.) to the RIS 518. In some instances, the RIS 518 may have previously discovered the UE 515 or other wireless devices in the area and/or may determine the UE 515 or other devices based on geometric relationships between the RIS 518 and the devices.

The RIS 518 may be configured with a receiver that may receive the information associated with the UE 515 or other wireless devices nearby the RIS 518 from the BS 505 over a broadcast message, a groupcast (e.g., multicast) message, and/or a unicast message from the BS 505 to the RIS 518. The RIS 518 may wake up from an idle state (e.g., a sleep mode) and receive the information associated with the UE 515 or other wireless devices nearby the RIS 518 before transmitting the RIS 518 information update without receiving the request for the RIS 518 information. In some instances, the BS 505 may transmit information to the RIS 518 indicating sleep/wake cycle times for the RIS 518 so that the RIS 518 may wake up at a predetermined time (e.g., a time and/or frequency determined by the BS 505) to transmit the RIS 518 information.

Figure 6:
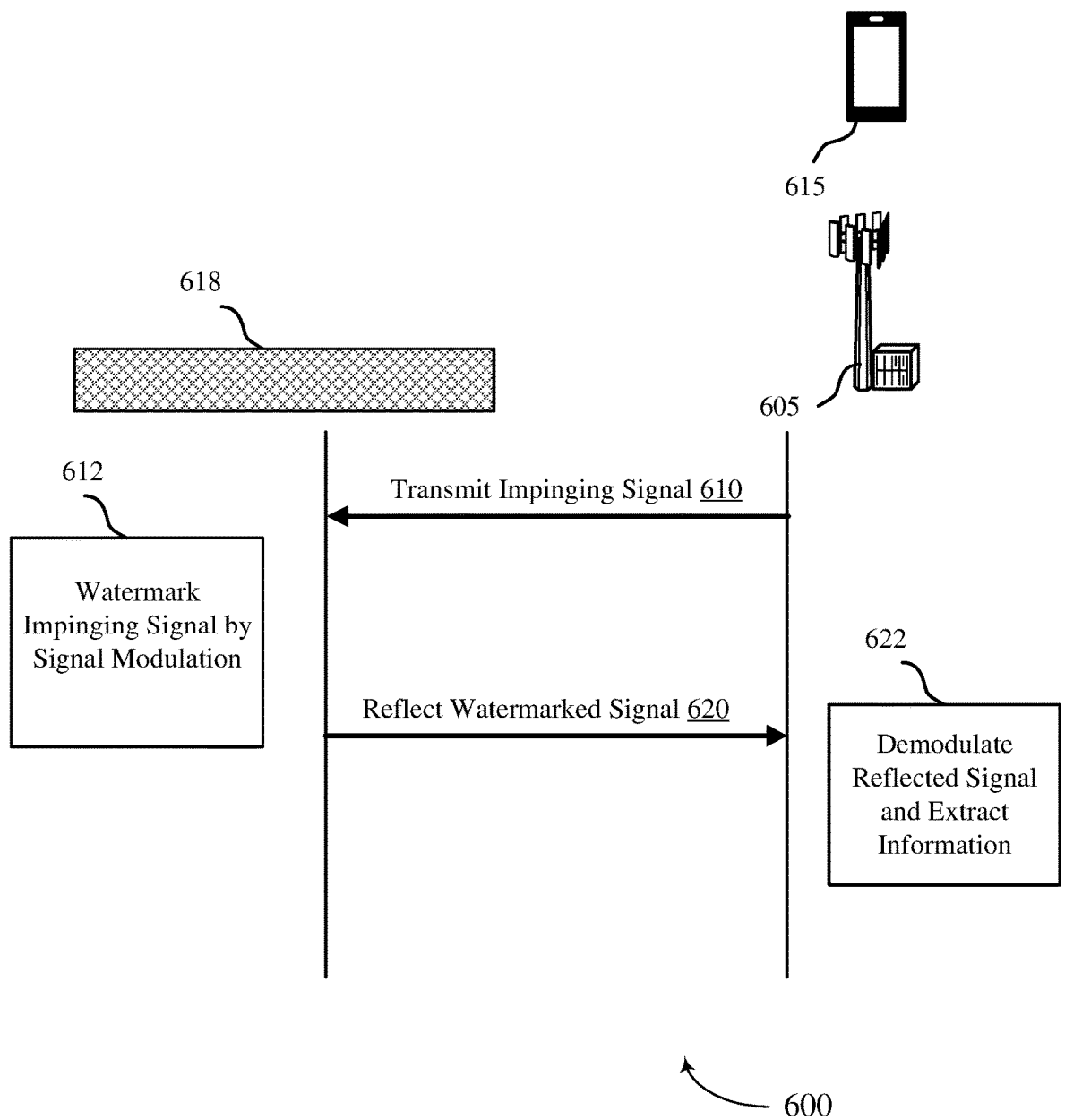
FIG. 6 illustrates a signaling diagram of a signal watermarking method according to some aspects of the present disclosure.

FIG. 6 illustrates a signaling diagram of a signal watermarking method 600 according to some aspects of the present disclosure. The method 600 may be implemented between a BS 605 and a RIS 618 or between a UE 615 and a RIS 618. The BS 605 may be similar to the BSs 105, 205, 305, 405, and/or 505, and RIS 618 may be similar to the RIS 218, 318, 418, and/or 518. The method 600 illustrates the BS 605 and/or the UE 615 obtaining RIS information associated with the RIS 618 directly from the RIS 618. The method 600 may utilize similar mechanisms as discussed above with reference to FIGS. 4 and 5 to obtain information associated with the RIS 618 from the RIS 618.

At 610, a BS 605 and/or UE 615 transmits a signal (e.g., a sensing signal, an impinging signal, a reference signal) to the RIS 618. The BS 605 and/or the UE 615 may transmit the signal in a direction towards the RIS 618. In some instances, the BS 605 and/or the UE 615 may have knowledge of the location of the RIS 618 relative to BS 605 and/or the UE 615 and the BS 605 and/or the UE 615 may use a beam-forming method to transmit the signal in the direction towards the RIS 618. The signal may be a reference signal, a cell specific reference signal, a pilot signal, a downlink reference signal such as a channel state information-reference signal (CSI-RS) (e.g., when the transmitter is the BS 605), a user equipment specific reference signal such as sounding reference signal (SRS) (e.g., when the transmitter is the UE 615), a RIS specific reference signal, etc.

At 612, in response to receiving the signal, the RIS 618 may watermark the signal by modulating the signal based on information (e.g., a sequence of message data bits) associated with the RIS 618. In some instances, the RIS 618 may watermark the signal as described above with reference to FIG. 4. The RIS 618 may watermark the signal to include information associated with RIS 618. The information may be requested by the BS 605 and/or the UE 615 by transmitting the signal to the RIS 618.

In some instances, the signal may be watermarked by a sequence of changes to the transmitted signal (e.g., modulating the signal). The modulation may include, without limitation, amplitude modulation, polarization modulation, phase modulation, or a combination thereof. The watermarked signal may encode the information associated with the RIS 618. For instance, the RIS 618 may configure one or more of the reflective elements (e.g., the elements 237) at the RIS 618 such that a portion of the received signal reflected back to the BS 605 is watermarked by the sequence of changes.

At 620, the RIS 618 may reflect the watermarked signal back to the BS 605 and/or the UE 615.

At 622, the BS 605 and/or the UE 615 may process (e.g., demodulate) the watermarked signal or a portion of the watermarked signal to extract the information associated with the RIS 618. For instance, the BS 605 and/or the UE 615 may demodulate the signal by determining a sequence of changes to the phases, amplitudes, and/or polarizations of the reflected watermarked signal and determine the RIS 618's information based on the sequence of changes. In some aspects, the BS 605 and/or the UE 615 may have information about the modulation scheme (e.g., signal phase, amplitude, and/or polarization) used by the RIS 618 to encode the RIS 618's information. Accordingly, the BS 605 and/or the UE 615 may perform demodulation based on the modulation scheme. The BS 605 and/or the UE 615 may map the sequence of changes back to information bits to obtain the RIS 618's information.

Figure 7:
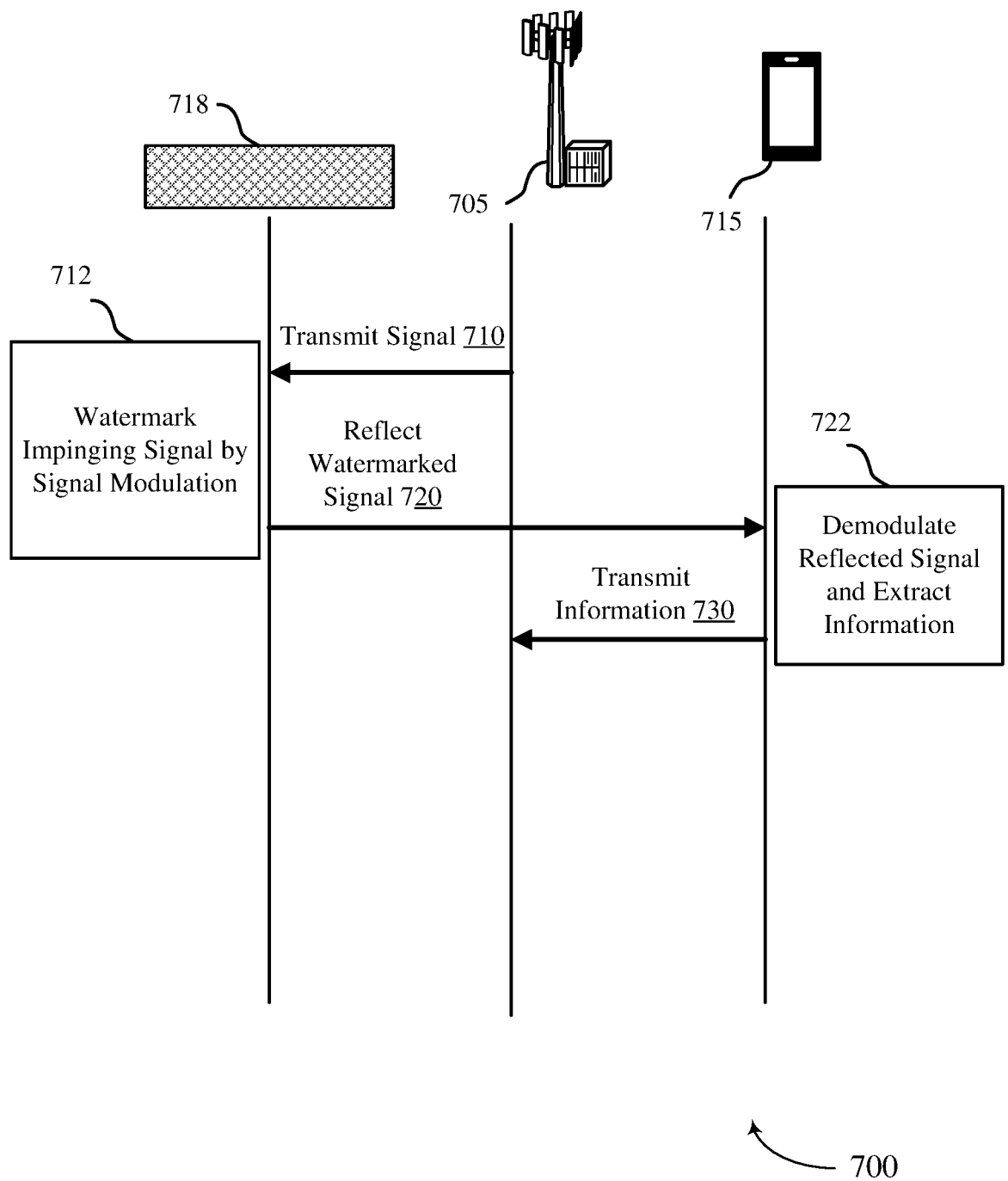
FIG. 7 illustrates a signaling diagram of a RIS information update method using signal watermarking according to some aspects of the present disclosure.

FIG. 7 illustrates a signaling diagram of a signal watermarking method 700 according to some aspects of the present disclosure. The method 700 may be implemented among a BS 705, a UE 715, and a RIS 718. The BS 705 may be similar to the BSs 105, 205, 305, 405, 505, and/or 605, and the RIS 718 may be similar to the RIS 218, 318, 418, 518, and/or 618. The method 700 illustrates the BS 705 obtaining RIS information associated with the RIS 718 relayed by the UE 715. The method 700 may utilize similar mechanisms as discussed above with reference to FIGS. 4-6 to obtain information associated with the RIS 718 from the RIS 718.

At 710, the BS 705 transmits a signal (e.g., a sensing signal, an impinging signal, a reference signal) to the RIS 718. The BS 705 may transmit the signal in a direction towards the RIS 718. In some instances, the BS 705 may have knowledge of the location of the RIS 718 relative to the BS 705 and the BS 705 may use a beam-forming method to transmit the signal in the direction towards the RIS 718. The signal may be a reference signal, a cell specific reference signal, a pilot signal, a downlink reference signal, a user equipment specific reference signal, a RIS specific reference signal, etc.

At 712, in response to receiving the signal, the RIS 718 may watermark the signal by modulating the signal based on information (e.g., a sequence of message data bits) associated with the RIS 718. In some instances, the RIS 718 may watermark the signal as described above with reference to FIG. 4. The RIS 718 may watermark the signal to include information associated with the RIS 718. The information may be requested by the BS 705 by transmitting the signal to the RIS 718. In some instances, the signal may be watermarked by a sequence of changes to the transmitted signal (e.g., modulating the signal). The modulation may include, without limitation, amplitude modulation, polarization modulation, phase modulation, or a combination thereof. The watermarked signal may encode the information associated with the RIS 718.

At 720, the RIS 718 may reflect the watermarked signal to a UE 715.

At 722, the UE 715 may process (e.g., demodulate) the watermarked signal or a portion of the watermarked signal to extract the information associated with the RIS 718. For instance, the UE 715 may demodulate the signal by determining a sequence of changes to the phases, amplitudes, and/or polarizations of the reflected watermarked signal and determine the RIS 718's information based on the sequence of changes. In some aspects, the UE 715 may have information about the modulation scheme (e.g., signal phase, amplitude, and/or polarization) used by the RIS 718 to encode the RIS 718's information. Accordingly, the UE 715 may perform demodulation based on the modulation scheme. The UE 715 may map the sequence of changes back to information bits to obtain the RIS 718's information.

At 730, the UE 715 may transmit the information to the BS 705. The UE 715 may transmit the information to the BS 705 via uplink control information (UCI) signaling, medium access control (MAC) control element (CE) signaling, radio resource control (RRC) signaling, other signaling channels, or a combination thereof.

Figure 8:
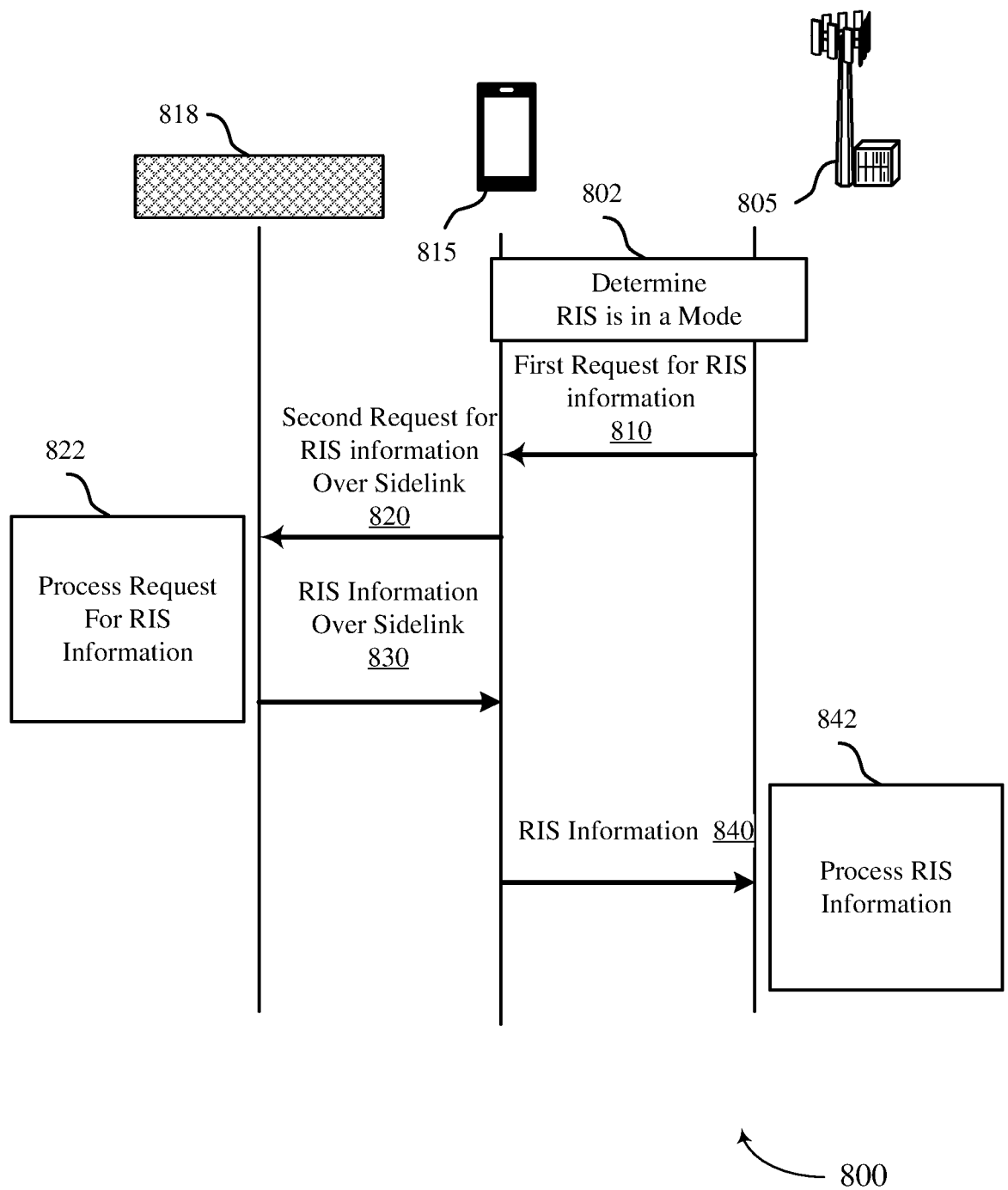
FIG. 8 illustrates a signaling diagram of a RIS information update method using sidelink communication according to some aspects of the present disclosure.

FIG. 8 illustrates a signaling diagram of a method 800 to obtain information from a RIS according to some aspects of the present disclosure. The method 800 may be implemented among a BS 805, a UE 815, and a RIS 818. The BS 805 may be similar to the BSs 105, 205, 305, 405, 505, 605, and/or 705, and the RIS 818 may be similar to the RIS 218, 318, 418, 518, 618, and/or 718. The method 800 illustrates the BS 805 obtaining RIS information associated with the RIS 818 relayed by the UE 815. Contrasting to the method 700, the UE 815 may obtain information from the RIS 818 via message transfer over a sidelink channel instead of from a reflected watermarked signal. The method 800 may utilize similar mechanisms as discussed above with reference to FIG. 5 to obtain information associated with the RIS 818 from the RIS 818. Additionally, the method 800 may include the BS 805 determining that the RIS 818 is in a mode (e.g., a reduced transmit capability mode) and triggering a RIS information request based on the RIS 818 operating in the mode.

At 802, the BS 805 may determine that the RIS 818 is in a mode that limits the transmit capabilities of the RIS 818. For example, the BS 805 may determine that the RIS 818 is configured with limited transmit capabilities, the RIS 818 is in a sleep mode, etc. In some aspects, the BS 805 may obtain the operating mode of the RIS 818 based on information previously received from the RIS 818. In other aspects, the BS 805 may have previously configured the RIS 818 to operate in the mode. For instance, the BS 805 may have previously configured the RIS 818 to enter a sleep mode or low-power mode.

At 810, the BS 805 may transmit a first request for information associated with the RIS 818 to a UE 815. The UE 815 may be within wireless communication range of the RIS 818. The UE 815 and the RIS 818 may be configured with wireless communication units capable of communicating directly with each other (e.g., over a sidelink). In some aspects, the BS 805 may transmit the first request to the UE 815 based on the UE 815 located at a location nearby the RIS 818.

At 820, the UE 815 may transmit a second request for the information associated with the RIS 818 in response to receiving the first request. The UE 815 may transmit the second request to the RIS 818 over a sidelink. The second request may include substantially the same request information as the first request.

At 822, the RIS 818 may process the second request for the information. In some aspects, the second request (as initiated by the first request) may indicate an information update request, and thus the RIS 818 may respond with updated information (e.g., location, battery charge status, capabilities, identification, and/or authentication, etc.). In some aspects, the second request (as initiated by the first request) may indicate which of the information (e.g., location, battery charge status, capabilities, identification, and/or authentication, etc.) the request is requesting for.

At 830, the RIS 818 may transmit the information associated with the RIS 818 to the UE 815. The RIS 818 may transmit the information to the UE 815 over the sidelink.

At 840, in response to receiving the information, the UE 815 may transmit (forward) the information to the BS 805. The UE 815 may transmit the information to the BS 805 via uplink control information (UCI) signaling, medium access control (MAC) control element (CE) signaling, radio resource control (RRC) signaling, other signaling channels, or a combination thereof.

At 842, upon receiving the RIS information, the BS 805 may process (e.g., demodulate) the watermarked signal or a portion of the watermarked signal to extract the information associated with the RIS 818. For instance, the BS 805 may demodulate the signal by determining a sequence of changes to the phases, amplitudes, and/or polarizations of the reflected watermarked signal and determine the RIS 818's information based on the sequence of changes. In some aspects, the BS 805 may have information about the modulation scheme (e.g., signal phase, amplitude, and/or polarization) used by the RIS 818 to encode the RIS 818's information. Accordingly, the BS 805 may perform demodulation based on the modulation scheme. The BS 805 may map the sequence of changes back to information bits to obtain the RIS 818's information.

In some aspects, a control node (e.g., a BS 105, 205, 305, 405, 505, 605, 705, and/or 805) in a network may control one or more RISs (e.g., a RIS 218, 318, 418, 518, 618, 718, and/or 818) in the network to flexibly configure wireless communication channels (signal propagation paths and/or fading paths) and may obtain information associated with the one or more RISs utilizing any suitable combination of mechanisms discussed above with reference to FIGS. 4-8. In general, the control node may initiate the RIS information update or the RIS may self-initiate information update based on certain triggering conditions(s). The control node may obtain RIS information directly from a RIS or indirectly via a UE (e.g., a UE 115, 215, 315, 415, 515, 615, 715, and/or 815). Further, the control node may obtain the RIS information by transmitting a sensing signal (a reference signal) to a RIS and receive a portion of the signal reflected from the RIS, where the RIS information may be encoded (or modulated) onto the reflected signal. In some aspects, prior to transmitting the sensing signal and/or inquiring the information associated with the RIS, the BS may inform the RIS about the reflective position and/or configuration of the RIS elements (e.g., the reflective elements 237) such that the RIS may be configured so that the RIS may receive the sensing signal and reflect the sensing towards a certain direction (e.g., towards the BS or a UE). In some instances, the BS may directly control the RIS pattern/state to achieve best sensing performance. For instance, the BS may be in communication with a controller (e.g., the controller 230) of the RIS and configure the controller with the information for configuring the reflective elements of the RIS. In some further aspects, the BS may wake up the RIS before transmitting the sensing signal or inquiry to the RIS, for example, if the RIS indicated to the BS prior to entering an idle mode or sleep mode or if the BS had not received any report or information from the RIS for a long period of time (e.g., a period longer than the predefined wait time before the RIS enter an idle state). That is, the BS may configure a wait time corresponding to the RIS's idle period. If the BS does not receive any report from the RIS after the wait time, the BS may wake up the RIS. In some aspects, the BS and/or the UE may communicate the request and/or the RIS information with the RIS according to a RIS communication protocol.

Figure 9:
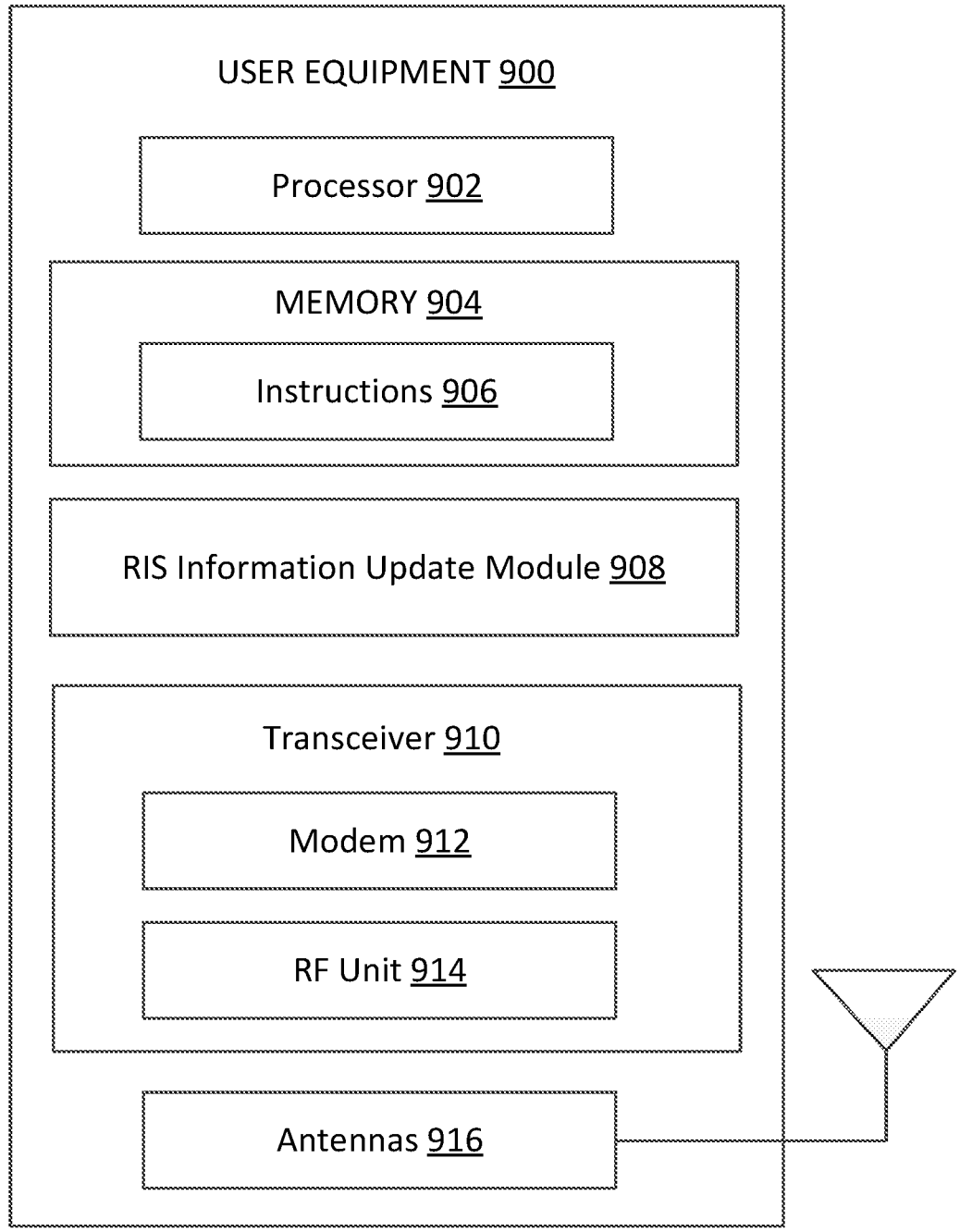
FIG. 9 is a block diagram of a user equipment (UE) according to some aspects of the present disclosure.

FIG. 9 is a block diagram of an exemplary UE 900 according to some aspects of the present disclosure. The UE 900 may be a UE 115, UE 215, UE 315, UE 415, UE 515, UE 615, UE 715, or UE 815, discussed above with reference to FIGS. 1-8. As shown in FIG. 9, the UE 900 may include a processor 902, a memory 904, a RIS information update module 908, a transceiver 910 including a modem subsystem 912 and a radio frequency (RF) unit 914, and one or more antennas 916. These elements may be coupled with one another. The term "coupled" may refer to directly or indirectly coupled or connected to one or more intervening elements. For instance, these elements may be in direct or indirect communication with each other, for example via one or more buses.

The processor 902 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 904 includes a non-transitory computer-readable medium. The memory 904 may store, or have recorded thereon, instructions 906. The instructions 906 may include instructions that, when executed by the processor 902, cause the processor 902 to perform the operations described herein with reference to the UEs 115, UE 215, UE 315, UE 415, UE 515, UE 615, UE 715, or UE 815, in connection with aspects of the present disclosure, for example, aspects of FIGS. 2-7 and 11. Instructions 906 may also be referred to as program code. The program code may be for causing a wireless communication device to perform these operations, for example by causing one or more processors (such as processor 902) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The RIS information update module 908 may be implemented via hardware, software, or combinations thereof. For example, the RIS information update module 908 may be implemented as a processor, circuit, and/or instructions 906 stored in the memory 904 and executed by the processor 902. In some instances, the RIS information update module 908 can be integrated within the modem subsystem 912. For example, the RIS information update module 908 can be implemented by a combination of software components (e.g., executed by a DSP or a general processor) and hardware components (e.g., logic gates and circuitry) within the modem subsystem 912.

The RIS information update module 908 may be used for various aspects of the present disclosure, for example, aspects of FIGS. 2-7 and 11. The RIS information update module 908 may be configured to control transceiver 910 to transmit a request for information to a RIS (e.g., RIS 218, RIS 318a, RIS 318b, RIS 418, RIS 518, RIS 618, RIS 718, RIS 818 of FIGS. 2-8 respectively). Transceiver 910 may transmit a signal to the RIS and receive a watermarked signal reflected back from the RIS. The RIS information update module 908 and/or transceiver 910 may be configured to extract the information from the watermarked signal and transmit the information to a BS (e.g., the BSs 105, BS 205, BS 305, BS 405, BS 505, BS 605, BS 705, BS 805, and/or BS1000). In some instances, the RIS information update module 908 may receive a first request for RIS information from a BS (e.g., the BSs 105, BS 505, BS 805, and/or BS 1000). The RIS information update module 908 may be configured to control transceiver 910 to transmit a second request for the RIS information to the RIS in response to the first request. The RIS information update module 908 may receive the information from the RIS and control transceiver 910 to transmit the information to the BS.

As shown in FIG. 9, the transceiver 910 may include the modem subsystem 912 and the RF unit 914. The transceiver 910 can be configured to communicate bi-directionally with other devices, such as the UEs 115 and/or 800, another BS 105, and/or another core network element. The modem subsystem 912 may be configured to modulate and/or encode data according to a MCS, e.g., a LDPC coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., phase modulated signals, amplitude modulated signals, polarization modulated signals, uplink control information (UCI) signaling, medium access control (MAC) control element (CE) signaling, radio resource control (RRC) signaling, a reference signal, a cell specific reference signal, a pilot signal, a downlink reference signal, a user equipment specific reference signal, or a RIS specific reference signal) from the modem subsystem 912 (on outbound transmissions) or of transmissions originating from another source, such as a UE 115. The RF unit 914 may be further configured to perform analog beamforming in conjunction with the digital beamforming. Although shown as integrated together in transceiver 910, the modem subsystem 912 and/or the RF unit 914 may be separate devices that are coupled together at the BS 105 to enable the BS 105 to communicate with other devices.

The RF unit 914 may provide the modulated and/or processed data, e.g., data packets (or, more generally, data messages that may contain one or more data packets and other information), to the antennas 916 for transmission to one or more other devices. The antennas 916 may further receive data messages transmitted from other devices. The antennas 916 may provide the received data messages for processing and/or demodulation at the transceiver 910. The transceiver 910 may provide the demodulated and decoded data (e.g., the information associated with the RIS, uplink control information (UCI) signaling, medium access control (MAC) control element (CE) signaling, or radio resource control (RRC) signaling) to the RIS information update module 908 for processing. The antennas 916 may include multiple antennas of similar or different designs in order to sustain multiple transmission links. The RF unit 914 may configure the antennas 916.

In an aspect, the UE 900 can include multiple transceivers 910 implementing different RATs (e.g., NR and LTE). In an aspect, the UE 900 can include a single transceiver 910 implementing multiple RATs (e.g., NR and LTE). In an aspect, the transceiver 910 can include various components, where different combinations of components can implement different RATs.

Figure 10:
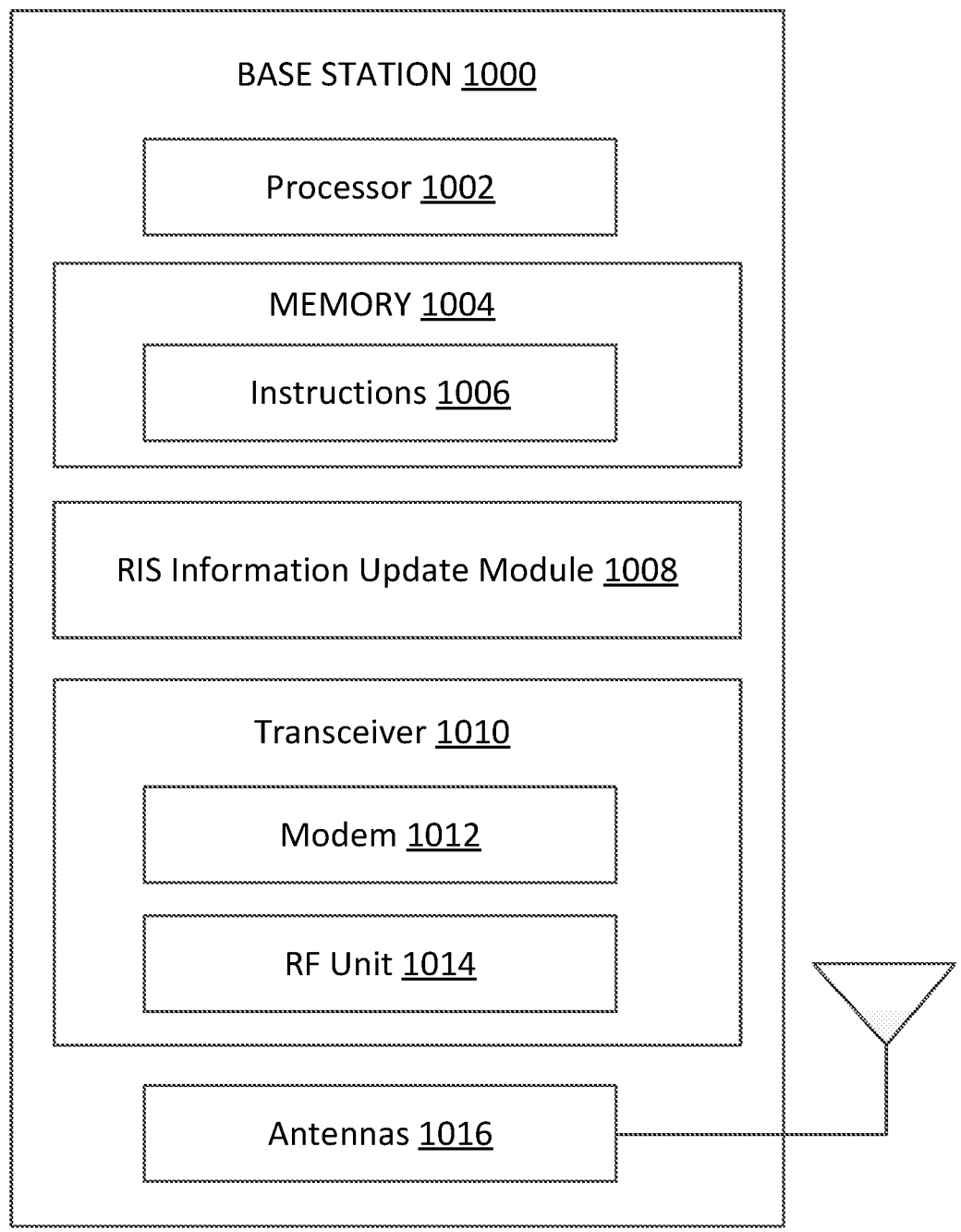
FIG. 10 is a block diagram of an exemplary base station (BS) according to some aspects of the present disclosure.

FIG. 10 is a block diagram of an exemplary BS 1000 according to some aspects of the present disclosure. The BS 1000 may be a BS 105 in the network 100 as discussed above in FIG. 1. The BS 1000 may be a BS 205, BS 305, BS 405, BS 505, BS 605, BS 705, or BS 805 as discussed above with reference to FIGS. 2-8. As shown in FIG. 10, the BS 1000 may include a processor 1002, a memory 1004, a RIS information update module 1008, a transceiver 1010 including a modem subsystem 1012 and a RF unit 1014, and one or more antennas 1016. These elements may be coupled with one another. The term "coupled" may refer to directly or indirectly coupled or connected to one or more intervening elements. For instance, these elements may be in direct or indirect communication with each other, for example via one or more buses.

The processor 1002 may have various features as a specific-type processor. For example, these may include a CPU, a DSP, an ASIC, a controller, a FPGA device, another hardware device, a firmware device, or any combination thereof configured to perform the operations described herein. The processor 1002 may also be implemented as a combination of computing devices, e.g., a combination of a DSP and a microprocessor, a plurality of microprocessors, one or more microprocessors in conjunction with a DSP core, or any other such configuration.

The memory 1004 may include a cache memory (e.g., a cache memory of the processor 1002), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1004 may include a non-transitory computer-readable medium. The memory 1004 may store instructions 1006. The instructions 1006 may include instructions that, when executed by the processor 1002, cause the processor 1002 to perform operations described herein, for example, aspects of FIGS. 2-8 and 11. Instructions 1006 may also be referred to as code, which may be interpreted broadly to include any type of computer-readable statement(s) as discussed above.

The RIS information update module 1008 may be implemented via hardware, software, or combinations thereof. For example, the RIS information update module 1008 may be implemented as a processor, circuit, and/or instructions 1006 stored in the memory 1004 and executed by the processor 1002. In some instances, the RIS information update module 1008 can be integrated within the modem subsystem 1012. For example, the RIS information update module 1008 can be implemented by a combination of software components (e.g., executed by a DSP or a general processor) and hardware components (e.g., logic gates and circuitry) within the modem subsystem 1012.

The RIS information update module 1008 may be used for various aspects of the present disclosure, for example, aspects of FIGS. 2-8 and 11. The RIS information update module 1008 may be configured to control transceiver 1010 to transmit a request for information to a RIS. Transceiver 1010 may be configured to transmit a signal to the RIS and receive a watermarked signal reflected back from the RIS. The RIS information update module 1008 and/or transceiver 1010 may be configured to extract (e.g., demodulate) the information from the watermarked signal. In some instances, the RIS information update module 1008 may transmit a request for RIS information to a UE (e.g., the UEs 115, UE 215, UE 315, UE 415, UE 515, UE 615, UE 715, UE 815, or UE 900). The RIS information update module 1008 may be configured to control transceiver 1010 to receive the RIS information from the UE in response to the request.

As shown in FIG. 10, the transceiver 1010 may include the modem subsystem 1012 and the RF unit 1014. The transceiver 1010 can be configured to communicate bi-directionally with other devices, such as the UEs 115, UE 215, UE 315, UE 415, UE 515, UE 615, UE 715, UE 815, UE 900, another BS 105, and/or another core network element. The modem subsystem 1012 may be configured to modulate and/or encode data according to a MCS, e.g., a LDPC coding scheme, a turbo coding scheme, a convolutional coding scheme, a digital beamforming scheme, etc. The RF unit 1014 may be configured to process (e.g., perform analog to digital conversion or digital to analog conversion, etc.) modulated/encoded data (e.g., phase modulated signals, amplitude modulated signals, polarization modulated signals, a reference signal, a cell specific reference signal, a pilot signal, a downlink reference signal, a user equipment specific reference signal, or a RIS specific reference signal) from the modem subsystem 1012 (on outbound transmissions) or of transmissions originating from another source, such as a UE 115. The RF unit 1014 may be further configured to perform analog beamforming in conjunction with the digital beamforming. Although shown as integrated together in transceiver 1010, the modem subsystem 1012 and/or the RF unit 1014 may be separate devices that are coupled together at the BS 105 to enable the BS 105 to communicate with other devices.

The RF unit 1014 may provide the modulated and/or processed data, e.g., data packets (or, more generally, data messages that may contain one or more data packets and other information), to the antennas 1016 for transmission to one or more other devices. The antennas 1016 may further receive data messages transmitted from other devices and provide the received data messages for processing and/or demodulation at the transceiver 1010. The transceiver 1010 may provide the demodulated and decoded data (e.g., the RIS information, uplink control information (UCI) signaling, medium access control (MAC) control element (CE) signaling, or radio resource control (RRC) signaling,) to the RIS information update module 1008 for processing. The antennas 1016 may include multiple antennas of similar or different designs in order to sustain multiple transmission links.

In an aspect, the BS 1000 can include multiple transceivers 1010 implementing different RATs (e.g., NR and LTE). In an aspect, the BS 1000 can include a single transceiver 1010 implementing multiple RATs (e.g., NR and LTE). In an aspect, the transceiver 1010 can include various components, where different combinations of components can implement different RATs.

Figure 11:
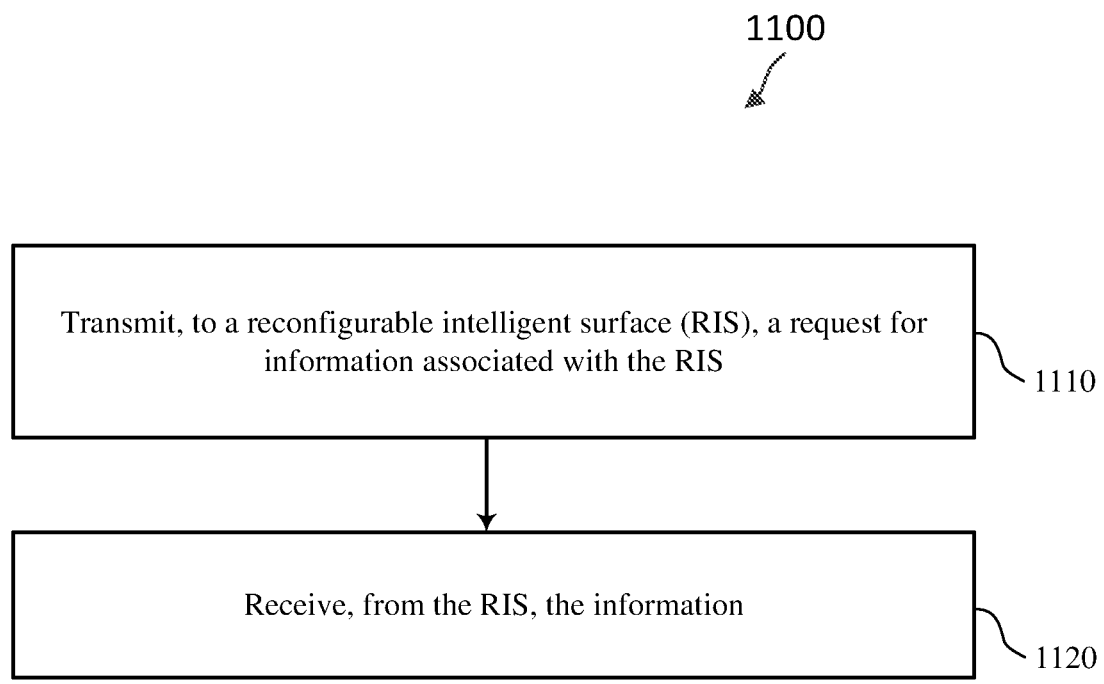
FIG. 11 is a flow diagram of a RIS information update method according to some aspects of the present disclosure.

FIG. 11 is a flow diagram of a communication method 1100 according to some aspects of the present disclosure. Steps of the method 1100 can be executed by a computing device (e.g., a processor, processing circuit, and/or other suitable component) of an apparatus or other suitable means for performing the steps. For example, a wireless communication device, such as UEs 115, UE 215, UE 315, UE 415, UE 515, UE 615, UE 715, UE 815, and/or UE 900, may utilize one or more components, such as the processor 902, the memory 904, the RIS information update module 908, the transceiver 910, and the one or more antennas 916, to execute the steps of method 1100. As another example, a wireless communication device, such as BSs 105, BS 205, BS 305, BS 405, BS 505, BS 605, BS 705, BS 805, and/or BS 1000, may utilize one or more components, such as the processor 1002, the memory 1004, the RIS information update module 1008, the transceiver 1010, and the one or more antennas 1016, to execute the steps of method 1100. The method 1100 may employ similar mechanisms as described above with respect to FIGS. 2-8. As illustrated in FIG. 11, the method 1100 includes a number of enumerated steps, but aspects of the method 1100 may include additional steps before, after, and in between the enumerated steps. In some aspects, one or more of the enumerated steps may be omitted or performed in a different order.

At block 1110, a wireless communication device may transmit, to a reconfigurable intelligent surface (RIS), a request for information associated with the RIS.

At block 1120, the wireless communication device may receive the information from the RIS. In some aspects, the information associated with the RIS may include, without limitation, a RIS identifier (e.g., a unique identifier), a location of the RIS, a mode status, a battery charge status, a sleep mode period, a wake mode period, a configuration, a firmware version, an error message, etc.

In some aspects, as part of transmitting the request at block 1110, the wireless communication device may transmit a signal (e.g., a sensing signal, a reference signal, a cell specific reference signal, a pilot signal, a downlink reference signal, a user equipment specific reference signal, a RIS specific reference signal, etc.) to the RIS. Further, as part of receiving the information at block 1120, the wireless communication device may receive at least a portion of a signal reflected from the RIS, where the at least the portion of the signal reflected from the RIS comprises a watermark based on the information associated with the RIS.

In some instances, the watermarked signal may be watermarked by a sequence of changes in the received signal. For instance, the sequence of changes in the received signal may include, without limitation, amplitude changes, polarization changes, phase changes, or a combination thereof. In some aspects, a binary bit 0 may be indicated by a certain signal property (e.g., phase, amplitude, polarization) change from one period to another period, and a binary bit 1 may be indicated by a lack of signal property change from one period to another period, or vice versa. In some instances, the phases of the received watermarked signal may be modulated by the information associated with the RIS. For instance, the sequence of phase changes in the received watermarked signal may represent the information associated with the RIS.

Additionally or alternatively, the polarizations of the received watermarked signal may be modulated by the information associated with the RIS. For instance, the sequence of polarization changes in the received watermarked signal may represent the information associated with the RIS. The polarization orientation may be modulated through any sequence and/or combination of linear, circular, or elliptical polarizations that enables the sequence of polarization changes to watermark (e.g., encode) the information associated with the RIS.

Additionally or alternatively, the amplitudes of the received watermarked signal may be modulated by the information associated with the RIS. For instance, the sequence of amplitude changes in the watermarked signal may represent the information associated with the RIS.

Further, in some aspects, the wireless communication device may decode the watermark from the at least the portion of the signal reflected from the RIS. For instance, the wireless communication device may extract the RIS information by demodulating the watermarked signal. The wireless communication device may extract the RIS information by demodulating the watermarked signal based on the phase modulation, polarization modulation, amplitude modulation, or combined modulation techniques described above with reference to FIG. 4. In some instances, the wireless communication device may have prior knowledge of the modulation techniques applied to the watermarked signal. In some instances, the wireless communication device may determine the type of modulation or combination of modulation techniques used based on processing the watermarked signal.

In some aspects, the wireless communication device may correspond to a UE such as a UE 115, 215, 315, 415, 515, 615, 715, 815, or 915, and as part of transmitting the request for information to the RIS at block 1110, the wireless communication device may transmit the request for the information to the RIS over a sidelink communication channel.

Further, as part of receiving the information at block 1120, the wireless device may receive the information from the RIS over the sidelink communication channel. Further, in some aspects, wireless communication device may transmit the information to a second wireless communication device (e.g., a BS 105, 205, 305, 405, 505, 605, 705, 805, and/or 905) via uplink control information (UCI) signaling, medium access control (MAC) control element (CE) signaling, or radio resource control (RRC) signaling.

In some aspects, the wireless communication device may correspond to a BS such as a BS 105, 205, 305, 405, 505, 605, 705, 805, and/or 905, and as part of transmitting the request for information to the RIS at block 1110, the wireless communication device may transmit the request via a second wireless communication device (e.g., a UE 115, 215, 315, 415, 515, 615, 715, 815, or 915). Further, as part of receiving the information at block 1120, the wireless device may receive the information from the RIS via the second wireless communication device.

Figure 12:
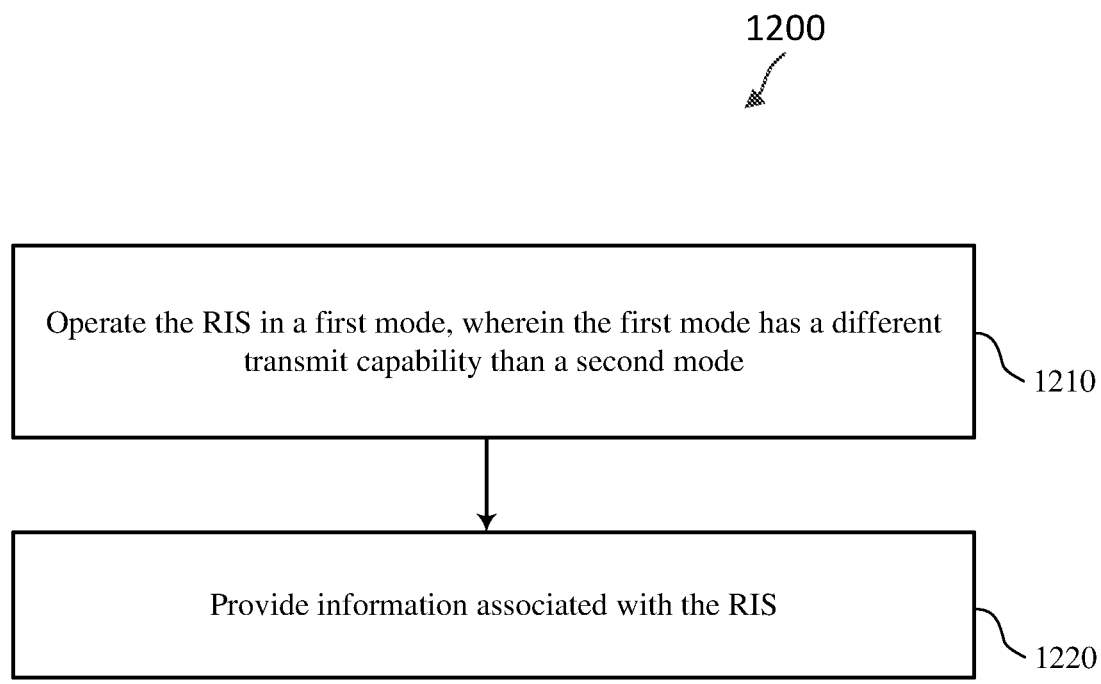
FIG. 12 is a flow diagram of a RIS information update method according to some aspects of the present disclosure.

FIG. 12 is a flow diagram of a communication method 1200 according to some aspects of the present disclosure. Steps of the method 1200 can be executed by a computing device (e.g., a processor, processing circuit, and/or other suitable component) of an apparatus or other suitable means for performing the steps. For example, a RIS such as the RIS 218, 318, 418, 518, 618, 718, 818, and/or 918 may include an array of reflective elements such as the array 226 and a controller such as the controller 230 configured to execute the steps of method 1200. The method 1200 may employ similar mechanisms as described above with respect to FIGS. 2-8. As illustrated in FIG. 12, the method 1200 includes a number of enumerated steps, but aspects of the method 1200 may include additional steps before, after, and in between the enumerated steps. In some aspects, one or more of the enumerated steps may be omitted or performed in a different order.

At block 1210, a RIS operates in a first mode, where the first mode has a different transmit capability than a second mode. In some aspects, the first mode is configured to limit at least one transmission capability of the RIS.

At block 1220, the RIS provides information associated with the RIS. In some aspects, the information associated with the RIS may include, without limitation, a RIS identifier (e.g., a unique identifier), a location of the RIS, a mode status, a battery charge status, a sleep mode period, a wake mode period, a configuration, a firmware version, an error message, etc.

In some aspects, the RIS may further receive a signal from a first wireless communication device. The signal may include at least one of a sensing signal, a reference signal, a cell specific reference signal, a pilot signal, a downlink reference signal, a user equipment specific reference signal, or an RIS specific reference signal. As part of providing the information associated with the RIS at block 1220, the RIS may reflect at least a portion of the signal to a second wireless communication device (e.g., different than the first wireless communication device). The reflecting the at least the portion of the signal may include watermarking the at least the portion of the signal based on the information associated with the RIS. In some aspects, the watermarking the at least the portion of the signal based on the information comprises reflecting the signal with a sequence of at least one of amplitude changes, polarization changes, or phase changes to the signal, the sequence of the at least one of the amplitude changes, the polarization changes, or the phase changes being based on the information. In some aspects, the RIS may perform the watermarking as discussed above with reference to FIG. 4.

In some aspects, the RIS may receive a signal from a first wireless communication device, and as part of providing the information associated with the RIS at block 1220, the RIS may reflect at least a portion of the signal to the first wireless communication device. The reflecting the at least the portion of the signal comprises watermarking the at least the portion of the signal based on the information associated with the RIS.

In some aspects, the RIS may further receive a request for the information associated with the RIS, and the wireless communication device may provide the information at block 1220 in response to the request. Further, in some aspects, as part of providing the information associated with the RIS at block 1220, the wireless communication device may transmit the information to a base station (BS). In another aspect, as part of providing the information associated with the RIS at block 1220, the wireless communication device may transmit the information to a user equipment (UE).

In some aspects, as part of providing the information associated with the RIS at block 1220, the wireless communication device may transmit the information via at least one of uplink control information (UCI) signaling, medium access control (MAC) control element (CE) signaling, or radio resource control (RRC) signaling.

In some aspect, the RIS may further switch from operating in the first mode to operating in the second mode. In some aspects, the first mode is a sleep mode and the second mode is an awake mode.

By way of non-limiting examples, the following aspects are included in the present disclosure.

Aspect 1 includes a method of wireless communication performed by a wireless communication device, the method comprising transmitting, to a reconfigurable intelligent surface (RIS), a request for information associated with the RIS and receiving, from the RIS, the information.

Aspect 2 includes the method of aspect 1, wherein the transmitting the request for the information comprises transmitting a signal to the RIS, and the receiving the information comprises receiving at least a portion of a signal reflected from the RIS, wherein the at least the portion of the signal reflected from the RIS comprises a watermark based on the information associated with the RIS, and the method further comprises decoding the watermark from the at least the portion of the signal reflected from the RIS.

Aspect 3 includes the method of any of aspects 1-2, wherein the watermark comprises a sequence of at least one of amplitude changes, polarization changes, or phase changes to the signal, the sequence of the at least one of the amplitude changes, the polarization changes, or the phase changes being based on the information.

Aspect 4 includes the method of any of aspects 1-3, wherein the signal comprises at least one of a reference signal, a cell specific reference signal, a pilot signal, a downlink reference signal, a user equipment specific reference signal, or a RIS specific reference signal.

Aspect 5 includes the method of any of aspects 1-4, wherein the transmitting the request for the information comprises transmitting the request over a sidelink communication channel, the receiving the information comprises receiving the information over the sidelink communication channel, and the method further comprises transmitting the information to a second wireless communication device via at least one of uplink control information (UCI) signaling, medium access control (MAC) control element (CE) signaling, or radio resource control (RRC) signaling.

Aspect 6 includes the method of any of aspects 1-5, wherein the wireless communication device comprises a user equipment (UE).

Aspect 7 includes the method of any of aspects 1-6, wherein the wireless communication device comprises a base station (BS).

Aspect 8 includes a method of wireless communication performed by a reconfigurable intelligent surface (RIS), the method comprising operating the RIS in a first mode, wherein the first mode has a different transmit capability than a second mode, and providing information associated with the RIS.

Aspect 9 includes the method of aspect 8, further comprising receiving a signal from a first wireless communication device, wherein the providing the information associated with the RIS comprises reflecting at least a portion of the signal to a second wireless communication device, wherein the reflecting the at least the portion of the signal comprises watermarking the at least the portion of the signal based on the information associated with the RIS.

Aspect 10 includes the method of any of aspects 8-9, wherein the watermarking the at least the portion of the signal based on the information comprises reflecting the signal with a sequence of at least one of amplitude changes, polarization changes, or phase changes to the signal, the sequence of the at least one of the amplitude changes, the polarization changes, or the phase changes being based on the information.

Aspect 11 includes the method of any of aspects 8-10, wherein the signal comprises at least one of a reference signal, a cell specific reference signal, a pilot signal, a downlink reference signal, a user equipment specific reference signal, or a RIS specific reference signal.

Aspect 12 includes the method of any of aspects 8-11, further comprising receiving a signal from a first wireless communication device, wherein the providing the information associated with the RIS comprises reflecting at least a portion of the signal to the first wireless communication device, wherein the reflecting the at least the portion of the signal comprises watermarking the at least the portion of the signal based on the information associated with the RIS.

Aspect 13 includes the method of any of aspects 8-12, further comprising receiving a request for the information associated with the RIS, wherein the providing the information is in response to the request.

Aspect 14 includes the method of any of aspects 8-13, wherein the providing the information associated with the RIS comprises transmitting the information to a base station (BS).

Aspect 15 includes the method of any of aspects 8-14, wherein the providing the information associated with the RIS comprises transmitting the information to a user equipment (UE).

Aspect 16 includes the method of any of aspects 8-15, wherein the providing the information associated with the RIS comprises at least one of a mono-static RIS information update, a bi-static RIS information update, or a multi-static RIS information update.

Aspect 17 includes the method of any of aspects 8-16, wherein the first mode is configured to limit at least one transmission capability of the RIS.

Aspect 18 includes the method of any of aspects 8-17, further comprising switching from operating in the first mode to operating in the second mode.

Aspect 19 includes the method of any of aspects 8-18, wherein the first mode is a sleep mode and the second mode is an awake mode.

Aspect 20 includes the method of any of aspects 8-19, wherein the information includes an indication of at least one of a location of the RIS, a battery charge status of the RIS, a mode status of the RIS, a sleep mode period, or a wake mode period.

Aspect 21 includes a wireless communication device comprising a memory, a transceiver, and a processor coupled to the memory and the transceiver, wherein the processor and the transceiver are configured to perform any one of aspects 1-20.

Aspect 22 includes a reconfigurable intelligent surface (RIS) apparatus comprising a reflector array and a controller in communication with the reflector array, wherein the reflector array and the controller are configured to perform any one of aspects 1-20.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a wireless communication device, the method comprising:
    receiving, from a base station, a first request for information associated with a reconfigurable intelligent surface (RIS) based on a proximity of the wireless communication device to the RIS;
    transmitting, to the RIS, a second request for information associated with the RIS based on the first request; and
    receiving, from the RIS, at least a portion of a signal comprising a watermark based on per-symbol polarization changes, wherein the watermark comprises the information.

2. The method of claim 1, wherein:
    the transmitting the second request for the information comprises transmitting an incident signal to the RIS; and
    the receiving the information comprises:
        receiving at least the portion of the signal reflected from the RIS, wherein the at least the portion of the signal reflected from the RIS comprises the watermark based on the information associated with the RIS; and
    the method further comprises:
        decoding the watermark from the at least the portion of the signal reflected from the RIS.

3. The method of claim 2, wherein the watermark comprises a sequence of at least one of amplitude changes, the per-symbol polarization changes, or phase changes to the signal, the sequence of the at least one of the amplitude changes, the per-symbol polarization changes, or the phase changes being based on the information.

4. The method of claim 2, wherein the incident signal comprises at least one of a reference signal, a cell specific reference signal, a pilot signal, a downlink reference signal, a user equipment specific reference signal, or a RIS specific reference signal.

5. The method of claim 1, wherein:
    the receiving the information comprises receiving the information over a sidelink communication channel; and
    the method further comprises transmitting the information to a second wireless communication device via at least one of uplink control information (UCI) signaling, medium access control (MAC) control element (CE) signaling, or radio resource control (RRC) signaling.

6. The method of claim 1, wherein the wireless communication device comprises a user equipment (UE).

7. The method of claim 1, wherein the wireless communication device comprises a base station (BS).

8. A method of wireless communication performed by a reconfigurable intelligent surface (RIS), the method comprising:
    operating the RIS in a sleep mode, wherein the sleep mode has a different transmit capability than a wake mode;
    watermarking, in response to operating the RIS in the sleep mode, at least a portion of a signal from a first wireless communication device based on per-symbol polarization changes; and
    providing, based on the watermarking, information associated with the RIS.

9. The method of claim 8, further comprising:
receiving the signal from the first wireless communication device,
wherein the providing the information associated with the RIS comprises:
reflecting at least the portion of the signal to a second wireless communication device, wherein the reflecting the at least the portion of the signal comprises watermarking the at least the portion of the signal based on the information associated with the RIS and the second wireless communication device is different from the first wireless communication device.

10. The method of claim 9, wherein the watermarking the at least the portion of the signal based on the information comprises reflecting the signal with a sequence of at least one of amplitude changes, the per-symbol polarization changes, or phase changes to the signal, the sequence of the at least one of the amplitude changes, the per-symbol polarization changes, or the phase changes being based on the information.

11. The method of claim 9, wherein the signal comprises at least one of a reference signal, a cell specific reference signal, a pilot signal, a downlink reference signal, a user equipment specific reference signal, or a RIS specific reference signal.

12. The method of claim 8, further comprising:
receiving the signal from a first wireless communication device,
wherein the providing the information associated with the RIS comprises:
reflecting at least the portion of the signal to the first wireless communication device, wherein the reflecting the at least the portion of the signal comprises watermarking the at least the portion of the signal based on the information associated with the RIS.

13. The method of claim 8, further comprising:
receiving a request for the information associated with the RIS,
wherein the providing the information is in response to the request.

14. The method of claim 13, wherein the providing the information associated with the RIS comprises:
transmitting the information to a base station (BS).

15. The method of claim 13 wherein the providing the information associated with the RIS comprises:
transmitting the information to a user equipment (UE).

16. The method of claim 8, wherein the providing the information associated with the RIS comprises at least one of a mono-static RIS information update, a bi-static RIS information update, or a multi-static RIS information update.

17. The method of claim 8, wherein the sleep first mode is configured to limit at least one transmission capability of the RIS.

18. The method of claim 8, further comprising switching from operating in the sleep mode to operating in the wake mode.

19. The method of claim 18, further comprising partially or completely powering down a transmitter of the RIS based on operating the RIS in the sleep mode.

20. The method of claim 8, wherein the information includes an indication of at least one of:
a location of the RIS;
a battery charge status of the RIS;
a mode status of the RIS;
a sleep mode period; or
a wake mode period.

21. A wireless communication device comprising:
a memory;
a transceiver; and
a processor coupled to the memory and the transceiver, wherein the wireless communication device is configured to:
receive, from a base station, a first request for information associated with a reconfigurable intelligent surface (RIS) based on a proximity of the wireless communication device to the RIS;
transmit, to the RIS, a second request for information associated with the RIS based on the first request; and
receive, from the RIS, at least a portion of a signal comprising a watermark based on per-symbol polarization changes, wherein the watermark comprises the information.

22. The wireless communication device of claim 21, wherein the wireless communication device is further configured to:
transmit an incident signal to the RIS;
receive at least the portion of the signal reflected from the RIS, wherein the at least the portion of the signal reflected from the RIS comprises the watermark based on the information associated with the RIS; and
decode the watermark from the at least the portion of the signal reflected from the RIS.

23. The wireless communication device of claim 22, wherein the watermark comprises a sequence of at least one of amplitude changes, the per-symbol polarization changes, or phase changes to the signal, the sequence of the at least one of the amplitude changes, the per-symbol polarization changes, or the phase changes being based on the information.

24. The wireless communication device of claim 22, wherein the incident signal comprises at least one of a reference signal, a cell specific reference signal, a pilot signal, a downlink reference signal, a user equipment specific reference signal, or an RIS specific reference signal.

25. The wireless communication device of claim 21, wherein:
the wireless communication device is further configured to:
receive the information over a sidelink communication channel; and
transmit the information to a second wireless communication device via at least one of uplink control information (UCI) signaling, medium access control (MAC) control element (CE) signaling, or radio resource control (RRC) signaling.

26. The wireless communication device of claim 21, wherein the wireless communication device comprises a user equipment (UE).

27. The wireless communication device of claim 21, wherein the wireless communication device comprises a base station (BS).

28. A reconfigurable intelligent surface (RIS) apparatus comprising:
a reflector array configured to control a wireless propagation channel and watermark at least a portion of a signal based on per-symbol polarization changes; and
a controller in communication with the reflector array, the controller configured to cause the RIS to provide information associated with the RIS via a watermark in response to the RIS operating in a sleep mode.

29. The RIS apparatus of claim 28, wherein:
the reflector array is further configured to receive a signal from a wireless communication device; and the controller is further configured to watermark the signal based on the information associated with the RIS.

30. The RIS apparatus of claim 29, wherein the controller is further configured to watermark the signal based on a sequence of at least one of amplitude changes, the per-symbol polarization changes, or phase changes to the signal, the sequence of the at least one of the amplitude changes, the per-symbol polarization changes, or the phase changes being based on the information.

* * * * *